United States Patent
Whipple et al.

(10) Patent No.: US 10,735,270 B1
(45) Date of Patent: Aug. 4, 2020

(54) COMPUTER-BASED SYSTEMS CONFIGURED FOR NETWORK MODELLING AND MONITORING USING PROGRAMMING OBJECT BINDINGS AND METHODS OF USE THEREOF

(71) Applicant: GoDaddy.com, LLC, Scottsdale, AZ (US)

(72) Inventors: David Whipple, Sammamish, WA (US); Arne Josefsberg, Medina, WA (US); Tim J. LaBerge, Sammamish, WA (US); Anthony Fammartino, Mesa, AZ (US)

(73) Assignee: GoDaddy.com, LLC, Scottsdale, AZ (US)

( * ) Notice: Subject to any disclaimer, the term of this patent is extended or adjusted under 35 U.S.C. 154(b) by 0 days.

(21) Appl. No.: 16/588,685

(22) Filed: Sep. 30, 2019

(51) Int. Cl.
*G06F 3/00* (2006.01)
*H04L 12/24* (2006.01)
(Continued)

(52) U.S. Cl.
CPC ............ *H04L 41/12* (2013.01); *H04L 41/082* (2013.01); *H04L 41/0853* (2013.01);
(Continued)

(58) Field of Classification Search
CPC ......... H04L 41/12; H04L 41/22; H04L 45/74; H04L 41/082; H04L 41/145; H04L 41/0853; H04L 45/02
See application file for complete search history.

(56) References Cited

U.S. PATENT DOCUMENTS 9,811,588 B1 * 11/2017 Ohsie .................. G06F 11/3409
10,050,842 B2 8/2018 Salam et al.
(Continued)

FOREIGN PATENT DOCUMENTS

EP 2342866 A1 7/2011
RU 2660627 C2 * 7/2018

OTHER PUBLICATIONS

"Gray Failure: The Achilles' Heel of Cloud-Scale Systems" by Huang et al. HotOS '17, May 8-10, 2017 (Year: 2017).*
(Continued)

*Primary Examiner* — Jing-Yih Shyu
(74) *Attorney, Agent, or Firm* — Greenburg Traurig, LLP

(57) ABSTRACT

Embodiments of systems and methods for network modelling include determining a device representation of each device on a network. A normalized device representation associated with a device representation of each device is determined using a library of device representation parser functions. A static network map of the network is generated based on each normalized device representation. A routing protocol peering session is established between each device and a routing protocol server using a routing protocol. A status of each device and each link is determined based on updates from each routing protocol peering session. A live map of the network is generated based on the status of each device. Configuration errors and network errors are determined based at least in part on the static network map and the live map, and routing errors are determined based at least in part on a comparison between protocol prefixes and predetermined network invariants.

24 Claims, 9 Drawing Sheets

(51) Int. Cl.
*H04L 12/751* (2013.01)
*H04L 12/741* (2013.01)

(52) U.S. Cl.
CPC ............ *H04L 41/145* (2013.01); *H04L 41/22* (2013.01); *H04L 45/02* (2013.01); *H04L 45/74* (2013.01)

(56) References Cited

U.S. PATENT DOCUMENTS

| | | | | |
|---|---|---|---|---|
| 10,176,071 | B1* | 1/2019 | Ohsie | G06F 11/3034 |
| 10,341,184 | B2* | 7/2019 | Harneja | H04L 41/0873 |
| 10,348,564 | B2* | 7/2019 | Harneja | G06F 11/2289 |
| 10,411,996 | B2* | 9/2019 | Pani | H04L 41/0873 |
| 2007/0242607 | A1* | 10/2007 | Sadler | H04L 41/12 370/238 |
| 2009/0320093 | A1* | 12/2009 | Glazier | G06F 8/10 726/1 |
| 2016/0173338 | A1* | 6/2016 | Wolting | H04L 41/145 709/223 |
| 2017/0228658 | A1* | 8/2017 | Lim | H04L 63/1425 |
| 2019/0319926 | A1* | 10/2019 | Cummins | H04L 41/02 |

OTHER PUBLICATIONS

Breitbart et al., "Efficiently Monitoring Bandwith and Latency in IP Networks"; 2001 <<http://citeseerx.ist.psu.edu/viewdoc/download?doi=10.1.1.113.5099&rep=rep1&type=pdf>>.

Cisco Network Services Orchestrator ("NSO"); Solution Cloud Providers; retrieved on Sep. 30, 2019 <<https://www.cisco.com/c/en/us/solutions/service-provider/solutions-cloud-providers/network-services-orchestrator-solutions.html>>.

Cisco WAN Automation Engine ("WAE"); Routers; retrieved on Sep. 30, 2019 <<https://www.cisco.com/c/en/us/products/routers/wan-automation-engine/index.html>>.

GNS3 network simulator; retrieved on Sep. 30, 2019 <<https://www.gns3.com>>.

* cited by examiner

COMPUTER-BASED SYSTEMS CONFIGURED FOR NETWORK MODELLING AND MONITORING USING PROGRAMMING OBJECT BINDINGS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, GoDaddy, Inc., All Rights Reserved.

FIELD OF TECHNOLOGY

The present disclosure generally relates to computer-based systems configured for one or more novel technological applications of network modelling and monitoring using programming object bindings and methods of use thereof.

BACKGROUND OF TECHNOLOGY

A computer network system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users. Computer network system performance can be difficult to evaluate and predict, and therefore difficult to optimize.

SUMMARY OF DESCRIBED SUBJECT MATTER

In some embodiments, the present disclosure provides an exemplary technically improved computer-based method that includes at least the following steps of determining, by at least one processor, a device representation of each device of a plurality of devices on a network. A normalized device representation associated with at least one device representation of the plurality of devices is determined using a library of device representation parser functions; wherein at least one normalized device representation includes: i) a node associated with a respective device of the plurality of devices, ii) a policy for device connection protocols associated with the respective device, iii) one or more links associated with the respective device of the plurality of devices, and iv) a run-time device state; and where each link of the set of one or more links includes an electronic connection between the respective device and another device of the plurality of devices. A static network map of the network is generated based on each normalized device representation of the at least one device of the plurality of devices, where each normalized device representation of the at least one device of the plurality of devices includes i) a node configuration of a respective node at which the at least one device resides, ii) a link configuration for each link associated with the respective node at which the at least one device resides, and iii) a routing policy configuration associated with the respective node at which the at least one device resides. A routing protocol peering session is established between at least one device of the plurality of devices and a routing protocol server using a routing protocol. A status of at least one device and at least one link of the plurality of devices is determined based on updates from each routing protocol peering session; where the updates include a plurality of protocol prefixes. A live map of the network is generated based on the status of each device. Configuration errors and network errors are determined based at least in part on the static network map and the live map. Routing errors are determined based at least in part on a comparison between the plurality of protocol prefixes and a plurality of predetermined network invariants. A snapshot of a network state is recorded in a database at a selected time; where the network state includes a routing information base associated with at least one device of the plurality of devices; and where the routing information base includes the status of each device and the status of each link based on the updates.

In some embodiments, the present disclosure provides an exemplary technically improved computer-based method that includes at least the following steps of transmitting, by at least one first processor to at least one second processor, a visualization selection to represent a current topological state of a network selected by at least one user with at least one user computing device. A topological state visualization representing the current topological state of the network based at least in part on a static network map and a live map is received by the at least one first processor from the at least one second processor; where the current topological state of the network includes a respective state of each respective node associated with each respective device of a plurality of devices and the set of one or more links associated with the respective device of the plurality of devices. The at least one second processor generates the topological state visualization by: determining a device representation of each device of a plurality of devices on the network; determining a normalized device representation associated with at least one device representation of the plurality of devices using a library of device representation parser functions; where at least one normalized device representation includes: i) a node associated with a respective device of the plurality of devices, ii) a policy for device connection protocols associated with the respective device, iii) a set of links associated with the respective device of the plurality of devices, and iv) a run-time device state; where each link of the set of one or more links includes an electronic connection between the respective device and another device of the plurality of devices; generating the static network map of the network based on each normalized device representation of the at least one device of the plurality of devices, where each normalized device representation of the at least one device of the plurality of devices includes i) a node configuration of a respective node at which the at least one device resides, ii) a link configuration for each link associated with the respective node at which the at least one device resides, and iii) a routing policy configuration associated with the respective node at which the at least one device resides; establishing a routing protocol peering session between at least one device of the plurality of devices and a routing protocol server using a routing protocol; determining a status of at least one device and at least one link of the plurality of devices based on updates from each routing protocol peering session; where the updates include a plurality of protocol prefixes; generating the live map of the network based on the status of each device; determining configuration errors and network errors based at least in part on the static network map and the live map; determining routing errors based at least in part on a comparison between the plurality of protocol prefixes and a plurality of predetermined network invariants; recording in a database a snapshot of a network state at a selected time; where the network state includes a routing information base associated with at least one device of the plurality of devices; and where the routing information base includes the status of each device and each link based on the updates.

In some embodiments, the present disclosure provides an exemplary technically improved computer-based system that includes at least the following components of a network including a plurality of devices in electronic communication; a database in electronic communication with the network; and at least one processor in electronic communication with the network. The at least one processor is configured to perform instructions including: determining a device representation of each device of a plurality of devices on a network; determining a normalized device representation associated with each device representation of the plurality of devices using a library of device representation parser functions; where at least one normalized device representation includes: i) a node associated with a respective device of the plurality of devices, ii) a policy for device connection protocols associated with the respective device, iii) a set of one or more links associated with the respective device of the plurality of devices, and iv) a run-time device state; where each link of the set of one or more links includes an electronic connection between the respective device and another device of the plurality of devices; generating a static network map of the network based on each normalized device representation of the at least one device of the plurality of devices, where each normalized device representation of the at least one device of the plurality of devices includes i) a node configuration of a respective node at which the at least one device resides, ii) a link configuration for each link associated with the respective node at which the at least one device resides, and iii) a routing policy configuration associated with the respective node at which the at least one device resides; establishing a routing protocol peering session between at least one device of the plurality of devices and a routing protocol server using a routing protocol; determining a status of at least one device and of at least one link of the plurality of devices based on updates from each routing protocol peering session; where the updates include a plurality of protocol prefixes; generating a live map of the network based on the status of each device; determining configuration errors and network errors based at least in part on the static network map and the live map; determining routing errors based at least in part on a comparison between the plurality of protocol prefixes and a plurality of predetermined network invariants; recording in the database a snapshot of a network state at a selected time; where the network state includes a routing information base associated with at least one device of the plurality of devices; and where the routing information base includes the status of each device and each link based on the updates.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
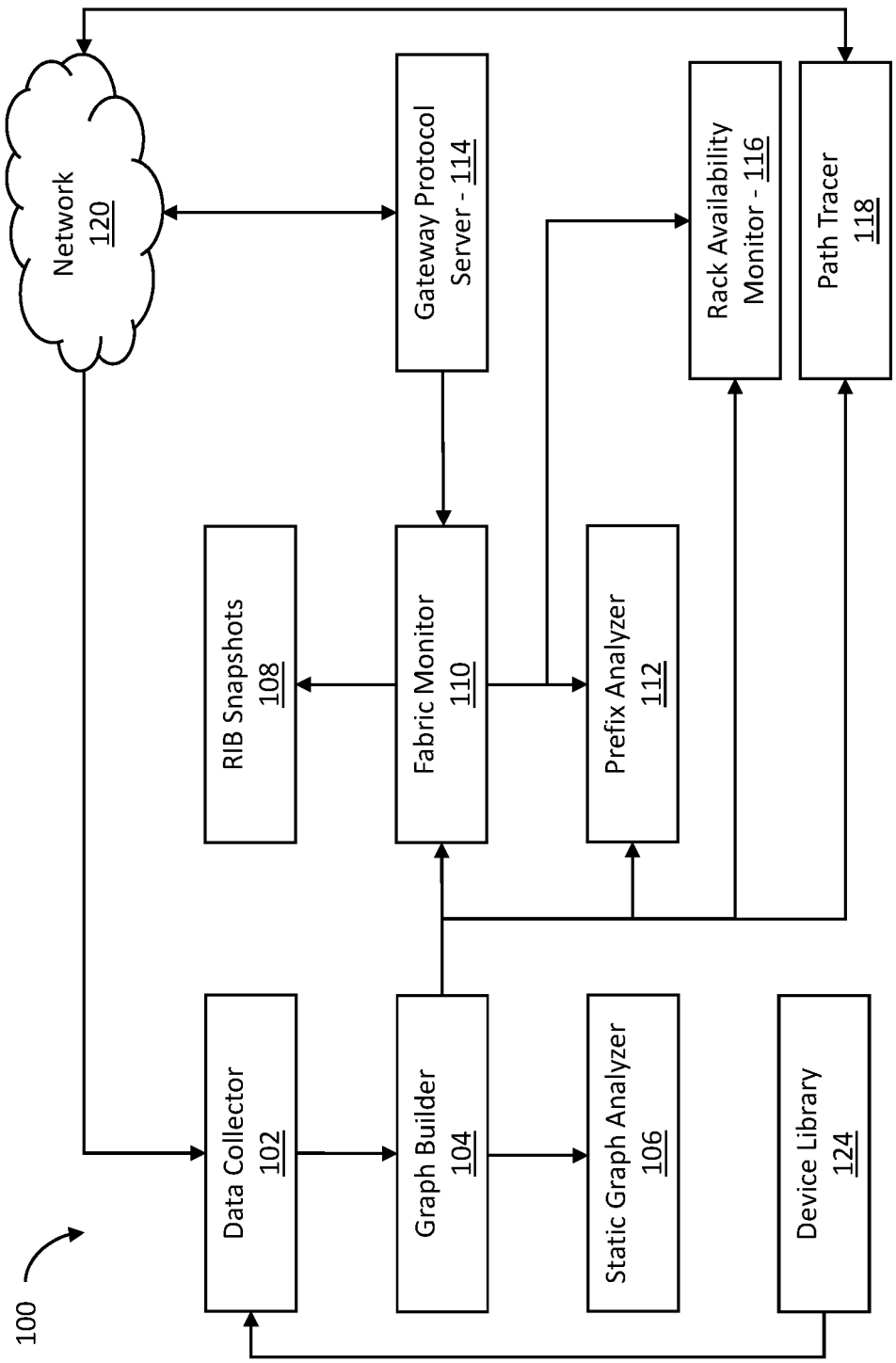
FIGS. 1-9 show one or more schematic flow diagrams and/or certain computer-based architectures which are illustrative of some exemplary aspects of at least some embodiments of network modelling and monitoring using programming object bindings and methods of use thereof of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Ethernet, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, microcontroller, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37)

Open Web Platform, (38) Oracle Database, (39) Qt, (40) SAP NetWeaver, (41) Smartface, (42) Vexi, and (43) Windows Runtime.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIGS. 1 through 9 illustrate systems and methods of modelling network topology for discovering and mitigating errors and inefficiencies in communication routing and device representation. The following embodiments provide technical solutions and/or technical improvements that overcome technical problems, drawbacks and/or deficiencies in the technical fields involving network device representations, routing protocols, network monitoring, network optimization and datacenter architectures. As explained in more detail, below, technical solutions and/or technical improvements herein include aspects of improved network and communication routing, network monitoring, network error discovery, network status monitoring, network status visualization, and network architecture optimization. Based on such technical features, further technical benefits become available to users and operators of these systems and methods. Moreover, various practical applications of the disclosed technology are also described, which provide further practical benefits to users and operators that are also new and useful improvements in the art.

FIG. 1 illustrates a block diagram of an exemplary inventive computer-based network modelling system with object bindings for network error monitoring and visualization in accordance with one or more embodiments of the present disclosure.

In some embodiments, the exemplary inventive computer-based network modelling system 100 may monitor an existing network to determine errors, inefficiencies and utilizations. As such, in some embodiments, the network modelling system 100 employs a data collector 102 and graph builder 104 to produce a model of the network. In some embodiments, the network is a datacenter network, however, the network may also be any other network including but not limited, e.g., a datacenter network, an internet-based network, an intranet network, a distributed network, or any other network of computing devices.

In some embodiments, some or all of the devices of the network may form nodes, such as routing nodes to propagating information throughout the network. The devices may route communications to other computing devices on the network according to a configuration defining, e.g., links to other nodes, policies regarding how routing and forwarding is performed, routing protocols to be used, header structures for packets, advertising policies, among other configurations. In some embodiments, a node may advertise routes according to a configuration using, e.g., header prefixes. Many of the configuration elements may be defined according to network invariants. Herein, invariants refer to aspects of network communication that are unchanged throughout operation. In some embodiments, invariants refer to policy and configuration details that the same for every node to facilitate a secure and performant network. Some examples of invariants may include security policies such as firewall policies, firewall location and routing policies, connection logging intervals, connection logging formats, network taps, among other possible details.

In some embodiments, the data collector 102 is in communication with the network 120 and collects, e.g., device representations for each device serving as a node, as well as information related links and states of operation associated with each device. In some embodiments, the data collector 102 may collect data from devices provided by a particular vendor, and thus collect configurations, policies, state information and link information in a vendor specific format. Here, a device representation refers to a file of commands used by the device to, e.g., determine a hostname, an internet protocol (IP) address, among other configurations for the connection to devices and routing of information. Here, state information relates to a run-time state of a device that may change over time, including, e.g., software version, operation status, connection strength, resource load, among other states. Here, link information relates to existing or past connections to one or more other devices and a status of each connections, among other link-related information. However, the network 120 may include devices from multiple different vendors, or the network modelling system 100 may be collecting data from multiple networks 120 provisioned by multiple different vendors. In fact, the network 120 may include devices that vary by more than just vendor. Rather, the network 120 may include devices with varying software versions, platforms, hardware configurations, hardware capabilities, and any other device differences. Thus, in some embodiments, the data collector 102 may normalize the collected data to facilitate interoperability and compatibility with devices having varying vendors, platforms, operating systems, software versions, hardware configurations, hardware capabilities among other differences.

In some embodiments, the data collector 102 examines the topology of the network 120 to determine the nodes of the network 120 and corresponding devices. In some embodiments, the data collector 102 may then communicate with each node device to retrieve device representations. The data collector 102 may receive a representation of device operation, including the device representations and state information, from the network 120 according to network protocols for communicating on the network. The device representations may then be normalized into a neutral form, such as, e.g., a vendor neutral, platform neutral and/or version neutral form. In some embodiments, the normalization may be performed using parser functions for translating a device representation from a vendor, platform and/or version specific format into a modelling system format that is vendor, platform and/or version neutral. In some embodiments, the data collector 102 may maintain a library of such parser functions in, e.g., a device library 124, with individual or sets of parser functions for reformatting configurations from each known vendor, version and/or platform combination. In some embodiments, to facilitate matching one or more parser function with a configuration, the data collector 102 may determine the vendor, platform and/or version associated with the configuration.

In some embodiments, the data collector 102 may determine the appropriate parser functions by indexing the parser functions in the device library 124 according to, e.g., version identifiers, platform identifiers and/or vendor or device hardware identifiers. Using the index, the data collector 102 may compare hardware and/or software identifiers in, e.g., the metadata of the configuration, accessing device application programming interfaces (APIs), web screenscraping, among other data collection techniques.

In certain cases, the device will return XML or JSON-formatted data which will need to be parsed before it can be put into the vendor neutral normalized form, with the indexed identifiers to match one or more parser functions in the device library 124. In some embodiments, the parser functions may utilize translation algorithms that translate data from fields of the device representations into the normalized format. The network 120 may include hardware and networking protocols from any combination of vendors, standards, versions and other differences for, e.g., link discovery in at layer 2 of a network. As a result, in some embodiments, network data, such as nodes and how those nodes are connected through physical interfaces, may be presented in a variety of ways.

Sometimes, the network data from one network 120 can have a variety of representations. In some embodiments, the parser functions may translate the presentation of network data from the network 120, as well as other networks of the same or different combination of hardware and protocols, into a generalized form that is normalized to be independent from hardware, software, vendors and standards implemented on a network.

In some embodiments, each parser function of library may translate a protocol or configuration from a particular device to the normalized or generalized form based on, e.g., the hardware, the software, the vendor, the protocol, or other characteristics. In some embodiments, some devices may vary in terminology used in the configuration to define objects. The parsers may translate the terminology of a particular, e.g., vendor, software platform, software version, protocol, hardware, etc. into a common terminology for the normalized form. Thus, the index in conjunction with the library of parser functions in the device library 124 can form a translation layer that maps data in each configuration into a common, normalized format. Herein, normalized refers to the process of transforming information having one or more of multiple possible formats into a single format that is neutral as to vendor, version, platform, hardware, or other aspect. In some embodiments, the normalized device representations may set forth configuration data for each device, including, e.g., nodes, links and/or routing policies. As such, in some embodiments the normalized device representations may include at least one node configuration, at least one link configuration, at least one routing policy configuration and combinations thereof for each node at which a device resides.

In some embodiments, the data collector 102 may communicate the normalized device representations to the graph builder 104 to generate a model of an architecture or topology of the network 120. Because the device representations include details as to a respective node, each link to another node and a policy defining device connection protocols for each link, the collection of normalized configurations can be assembled into a detailed map or model of each node and each link between nodes in the network 120. In some embodiments, the map or model of the network 120 reflects a static map of nodes, links and/or policies across the network 120 based on the devices from which configurations were collected.

In some embodiments, the map or model of the network is constructed using a suitable modelling language, such as, e.g., Yet Another Next Generation (YANG). Each device on the network 120 and its associated normalized configuration conforms to a representation of the normalized device representations, including, e.g., device representations, state information, link information and other operability information, based on the parser functions in the data collector 102. Each normalized device representation may be collected into a model that conforms a schema describing the devices and their relationships. For example, a YANG model using the normalized device representations may be structured as shown in Table 1 below:

TABLE 1

```
container nodes {
    description "Network devices";
    list node {
        key "name";
        leaf name {
            type string;
        }
        container interfaces {
            container loopback_interfaces {
                list loopback_interface {
                    key "unit";
                    leaf unit {
                        type uint32;
                    }
                    leaf ipv4_address {
                        type inet:ip_address;
                    }
                }
            }
        }
    }
}
```

In some embodiments, the network 120 includes a layer 3 network for, e.g., a datacenter. For example, in some embodiments, the network 120 may conform to the International Organization for Standardization (OSI) modality for networks, which include a plurality of layers where, e.g., layer 3 relates to a networking layer responsible for packet forwarding including routing, lower layers relate to more basic functionality used to implement layer 3, such as a physical layer at layer 1 responsible for the transmission and reception of unstructured raw data between nodes, a data link layer at layer 2 responsible for node-to-node data transfer, while higher layers relate generally to handling of information and data being routed, such as, e.g., a transport layer at layer 4, a session layer at layer 5, a presentation layer at layer 6 and an application layer at layer 7. In some embodiments, the network 120 conforms to a Transmission Control Protocol/Internet Protocol (TCP/IP) network modality, with a network access layer at layer 1, an internet layer at layer 2, a transport layer at layer 3 and an application layer at layer 4.

In some embodiments, the graph builder 104 may transform the, e.g., static network map or static network model into a network graph. In some embodiments, the network graph is a software object bound to the static map and/or model. In some embodiments, an object binding facilitates interaction with the static map and/or model in a way that reflects the natural hierarchy of a network, such as a datacenter network. In some embodiments, the network graph may include an instantiation of the static network model into an object representation suing using, e.g., the extensible markup language (XML). For example, the static model with object bindings may be instantiated into the network graph is exemplified in Table 2 below:

TABLE 2

```
<nodes>
    <node>
        <name>Node1</name>
        <interfaces>
            <loopback_interfaces>
                <looploack_interface>
                    <unit>0</unit>
                    <ipv4_address>1.1.1.1/32</ipv4_address>
                </loopback_interface>
            </loopback_interfaces>
        </interfaces>
    </node>
    <node>
        <name>
            Node2
```

TABLE 2-continued

```
        </name>
    </node>
</nodes>
```

The object binding and the object representation forming the network graph facilitates interaction using objects rather than using a database language. For example, the network graph and objects may be interacted with using a software language such as, but not limited to, e.g., Python, Java, C, C++, or other language, including object-oriented languages. Thus, the object binding can represent the static map and/or model using idioms associated with the language such that a user, such as, e.g., a programmer, engineer, administrator or other user may treat the object binding as a software object to be manipulated and modified using software engineering practices. For example, an administrator may obtain a list of each node and the IPv4 address of its loopback 0 interface using the, e.g., Python commands of Table 3 below:

TABLE 3

```
for node in nodes.node.values( ):
    print("Node {} loopback 0 address {}.".format(
        node.name,
        Node.interfaces.loopback_interfaces.loopback_interface[0].
        ipv4_address)
```

In some embodiments, Python is used, however any other programming language suitable for interacting with the network graph is contemplated. Such software engineering practices may include testing, continuous integration/continuous deployment, version control and other software engineering methodologies and techniques in a way that affects and improves the operation of the network 120. Thus, in some embodiments, the graph builder 104 can model the network 120 using the static map and/or model of the normalized configurations that is non-specific to vendor, platform, software version, or even hardware. The resulting network graph is therefore applicable across different datacenter architectures to validate properties and characteristics of the network 120 without concern for, e.g., vendor, platform, software version, or even hardware.

In some embodiments, the network graph may be produced by reading the normalized configuration data and using object bindings for, e.g., nodes, links, policies, among other attributes, to build the model of the network 120 with nodes, links, and policy defining how routing/forwarding works on the network/node. In some embodiments, the resulting model is then serialized as an object to produce the network graph and stored, e.g., on a storage device, in a database, or in other storage location. In some embodiments, the model is expressed in a data modelling language, such as, e.g., Yet Another Next Generation (YANG), or other suitable data modelling language. In some embodiments, the model may then be serialized to facilitate communication or storage or both of the model. For example, the model may be serialized using, e.g. pickling for Python, serializable for Java, serialize with PHP, or other serialization functions. In some embodiments, the model is serialized into, e.g., a Javascript object notation (JSON) object, an extensible markup language (XML) object, a YAML object, or other object.

In some embodiments, the network graph is used to analyze the topology and performance of the network 120. Because the network graph includes an object that is representative of the network map and/or model, the network graph may represent networks having any combination of, e.g., vendor, software version, platform, etc., for analysis, error tracking, routing monitoring, configuration error monitoring, configuration inefficiencies and duplication, among other aspects for identification of areas of improvement.

In some embodiments, a static graph analyzer 106 may receive the network graph to analyze the static network map and/or model. In some embodiments, the network 120 may have tens, hundreds, thousands or more nodes and tens, hundreds, thousands, ten thousands or more links. Therefore, the network 120 may function correctly under normal conditions while still including inconsistencies that lead to performance problems or even outages under expected failure conditions such as node reboots, link failures, software upgrade, and maintenances. Moreover, the network may include an architecture with certain properties or invariants that need to be satisfied in order for the network to function correctly under both normal and expected failure conditions. In some embodiments, the static network map and/or model may include data regarding the properties and invariants, and the network graph of the static network map and/or model, as a software object, may express the properties and invariants in code.

In some embodiments, the static graph analyzer 106 may run code corresponding to defined properties and invariants dictating operation of a network against the properties of the network graph. In so doing, the static graph analyzer 106 may find and remediate errors and inconsistencies in the network, preventing outages and ensuring correct operation. For example, in some embodiments, the static graph analyzer 106 may run code defining internet protocol (IP) address configuration rules (e.g., each device having a unique IP address), node redundancy rules, configuration verification rules such as, e.g., ensuring the redundant nodes are identical configurations including identical routing, confirming that the proper version of software is installed and running, among other network invariant rules. In some embodiments, the code may employ functions for checking a software object for properties having the invariants and rules described above, among other invariants. In some embodiments, therefore, by running the code for the invariants against the network graph, the code may check the object that is the network graph representing the static network map and/or model for errors and inconsistencies in the invariants dictating network functioning under both normal and expected failure conditions. Thus, in some embodiments, the static graph analyzer 106 may automatically identify errors and inconsistencies in the network graph, due, in part, to the ability to analyze the network graph as a software object using coded invariants for debugging the network 120.

In some embodiments, the network graph may be employed for live network monitoring by, e.g., comparing the static network graph with live updates from the network 120. In some embodiments, this comparison is performed by a fabric monitor 110 that subscribes to network updates. In some embodiments, the fabric monitor 110 builds out an expected routing topology based on the network graph by, e.g., translating the network graph object into an arrangement of the nodes in the network 120 based on the devices and links defined in the network graph.

In some embodiments, a gateway protocol server 114 collects the network updates from the network 120 using, e.g., peering sessions with each device on the network 120. In some embodiments, based on the network graph, gateway protocol configurations are pushed to each device on the network 120, where the gateway protocol configurations instruct each device to engage in a routing protocol peering session with an instance of a gateway protocol running on a dedicated server, such as, e.g., a gateway protocol server 114. In some embodiments, as routing changes in the network 120, updates are relayed to the gateway protocol server 114 via the routing protocol peering sessions. Thus, each device may report its respective routing status to the gateway protocol server 114, including, e.g., protocol prefixes, a current routing status including live links to other devices in the network 120 and reachability information between devices. Herein, the protocol prefixes refer to an address identifier for a route such as, e.g., an internet protocol address and/or bit-length, among other address identifiers.

In some embodiments, each device on the network 120 advertises some or all routes that it carries using, e.g., the protocol prefix updates. In some embodiments, each device advertises all routes, however in other embodiments, a subset of the routes may be advertised, such as, e.g., a predetermined subset of routes according to, e.g., a routing policy, or a user configurable subset, a user selectable subset, or other subset of routes. The collection of routes carried by the devices may be referred to as routing information base (RIB). In some embodiments, the RIB is advertised by each device on the network 120 to the gateway protocol server 114 across the respective routing protocol peering sessions, however the RIB may be advertised by some devices on the network 120 according to, e.g., selected subsets of devices according to, e.g., device type, location, user selection, configuration, routing policy, or other parameters for defining subsets of devices. In some embodiments, one or more devices on the network 120 may be expressly from monitoring by the gateway protocol server 114 to, e.g., reduce resource load at the gateway protocol server 114, mitigate incompatibility, quarantine trojan horses, viruses, and other malware, among other reasons for silencing protocol prefix updates from devices. In some embodiments, the gateway protocol server 114 may collect the RIB for some or all of the devices on the network 120 and provide it to the fabric monitor 110 along with the status updates.

In some embodiments, the updates are relayed from the gateway protocol server 114 to the fabric monitor 110. In some embodiments, fabric monitor 110 may include gateway protocol server 114. In some embodiments, the gateway protocol may include a suitable gateway protocol for peering and receiving routing updates at a server, such as, e.g., a border gateway protocol (BGP).

In some embodiments, comparing the updates from the gateway protocol server 114 with the topology from the network graph, the fabric monitor 110 may correlate reachability information between devices with specific configured links. As a result, in some embodiments, the fabric monitor 110 may determine link status, advertised routes including RIB, and/or reachability status (e.g., up/down state) of each link with each update from the gateway protocol server 114 to determine a current topologic state of the network 120 based on the most recent updates. In some embodiments, the current topological state of the network is presented in a visualization that updates in real-time, e.g., concurrently with each gateway protocol server 114 update and each device update via the routing protocol peering sessions. In some embodiments, the fabric monitor 110 also records every state change and/or route advertisement change, so that it is possible to visually replay the state of the network during past events. This is a valuable tool for post-mortem analysis of adverse network events. Accordingly, the current topological state may be used to determine errors or causes of errors to the network 120. In some embodiments, the current topological state may be constructed as a live map of the topological state of the network 120 for quick, efficient and accurate visualization by a user and/or administrator. In some embodiments, the live map may include, e.g., link status, reachability status, and/or protocol prefix data for each device, updated with the latest advertised data by the gateway protocol server 114.

Additionally, the live map of the current topological state, including at least the RIB, may be stored with each update in an RIB snapshots version control system (VCS) 108. In some embodiments, the entire network 120 RIB is snapshotted or stored in RIB snapshots VCS 108 with each update. In some embodiments, the change in the topological state is stored in RIB snapshots VCS 108. In some embodiments, the stored changes in the topological state may be used to recreate a previous live map. In some embodiments, by storing each change in RIB snapshots VCS 108 or automatically snapshotting the entire network 120 RIB before and after each change and storing it in RIB snapshots VCS 108, how a particular change affects network routing 120 may be quickly and precisely determined by viewing the snapshotted or recreated live map of the RIB after updating due to the change. Thus, in some embodiments, where there is an adverse event, the RIB snapshots in the RIB snapshots VCS 108 provides a tool that facilitates tracking how routing in the network 120 changes over time, both before and after the event. Thus, the RIB snapshots in the RIB snapshots VCS 108 facilitate post-mortem analysis for the event to determine a root cause of the event.

In some embodiments, the fabric monitor 110 updates the status and RIB of each link with each update from the gateway protocol server 114. In some embodiments, the gateway protocol server 114 may receive updates from each device on a periodic basis, such as, e.g., every minute, every hour, every day, or by any other period. In some embodiments, the gateway protocol server 114 may monitor the devices for continual updates upon each change in reachability and/or routing status of each device resulting in a constant, real-time stream of status updates. In some embodiments, the gateway protocol server 114 may provide the latest updates from the devices in the network 120 concurrently with receiving the updates. In some embodiments, the gateway protocol server 114 may provide the fabric monitor 110 with updates on a periodic basis, such as, every minute, every hour, every day, or by any other period. The update periods by the devices and by the gateway protocol server 114 may be the same or different.

In some embodiments, the fabric monitor 110 may provide the current topological state of the network, including current protocol prefixes advertised by the devices of the network 120, to a prefix analyzer 112. Efficient and error-free operation of the network 120 may be facilitated by adhering to network invariants, such as those described above, to ensure correct operation. Similar to the static graph analyzer 106, the prefix analyzer 112, in some embodiments, may express the invariants in code based on the network graph and its object binding. The prefix analyzer 112 may then run the invariants against the protocol prefixes from the fabric monitor 110. As described above, the protocol prefixes may include routing information, such as address identifiers for routing. Each update from the devices on the network 120 may advertise protocol prefixes for the routes configured for each respective device. In some embodiments, the prefix analyzer 112 uses the prefixes and the coded invariants to identify and report, e.g., statistics, errors, and inconsistencies with routing during network operation. In some embodiments, critical errors can be used as the basis for automated alerting and remediation. In some embodiments, the prefix analyzer 112 may rerun the prefix analysis whenever advertisements across the routing protocol peering sessions change.

In some embodiments, the configured routes of each device may include aggregate routes configured by an aggregate configuration. An aggregate route is a route advertised by a device in a routing protocol peering session that replaces advertisements of one or more more specific routes with a broader advertisement. For example, where the routing protocol peering session is advertising routes such as, e.g., 10.253.0.1/32, 10.253.0.2/32, . . . 10.253.0.254, if the aggregate 10.253.0.0/24 is configured, then instead of advertising 10.253.0.1/32, 10.253.0.2/32, . . . 10.253.0.254, the routing protocol peering session advertises the single route 10.253.0.0/24. In some embodiments, aggregates may be useful by resulting in fewer BGP routes and hide routing churn in the more specific routes, thus increasing efficiency of the network 120. However, in some embodiments, aggregates are not advertised unless there is a more specific route configured and/or active at a respective device. Thus, in some embodiments, where an aggregate route fails to include any specific routes, the aggregate route is not advertised. Such an unadvertised but configured aggregate route may be deemed a sleeping aggregate.

In some embodiments, the network 120 may be constructed with multiple routing layers. Lower layers of such a construction may refer to specific routes (e.g., individual node-to-node routes), while successively higher layers from aggregates of the specific routes. In some embodiments, nodes may advertise the highest layer of routes so that the specific routes may be consolidated to reduce the size of, e.g., routing tables maintained at the gateway protocol server 114. Routing may then be performed first according to aggregate routes based on a selected source and destination, and the nodes may then determine specific routes within the aggregate routes. However, in some cases, sleeping aggregate routes may be caused by aggregate routes being mistakenly configured by an incorrect aggregate configuration at, e.g., two routing layers of the network 120. The aggregate route at the lower layer becomes active, but the aggregate route at the higher layer that includes the aggregate route at the lower layer may be sleeping, since the aggregate route at the lower layer is hiding the more specific routes. In some embodiments, a sleeping aggregate route could be activated incorrectly, resulting in traffic routing to an associated device via the aggregate route being dropped as the more specific routes are hidden by the aggregate route at the lower layer. Accordingly, sleeping aggregate routes risk routing errors and routing inefficiencies.

Sleeping aggregates are usually a result of an incomplete network migration. Inadvertent activation of a sleeping aggregate can happen if a route advertisement leaks onto the switch with the sleeping aggregate. Leaked static host routes (i.e., static routes with prefix length 32) are a frequent cause as they will always cause a larger aggregate to activate.

In some embodiments, the fabric monitor 110 has visibility into all routing advertisements while the data collector 102 collects the configured aggregate routes from devices in the network 120. By comparing the configured prefixes, including the configured aggregate routes, mapped and/or modelled in the network graph and the advertised prefixes received and mapped by the fabric monitor 110, the prefix analyzer 112 may compare configured aggregate routes versus advertised aggregate routes. In some embodiments, the prefix analyzer 112 may identify sleeping aggregates in the network 120 based on the configured aggregates that are not being advertised. In some embodiments, once identified, the sleeping aggregates can be removed from devices where they are incorrectly configured, thus improving performance and reducing errors in communication across the network 120.

In some embodiments, the routing prefix information, such as, e.g., the live map and/or a list or table of routing protocol prefixes, may be supplied to a rack availability monitor 116 along with the network graph from the graph builder 104. In some embodiments, servers are deployed in racks containing many servers, such as, e.g., up to 96 servers. A rack may contain at least one Top of Rack (ToR) switch to provide external network 120 connectivity. In some embodiments, if applications running on servers in the rack require a high degree of network availability, two ToRs will be deployed in the rack and servers will have redundant connections to each ToR. In some embodiments, the ToRs connect up to a layer of switches called spines which themselves are multiply redundant and aggregate connections from many ToR racks.

In some embodiments, the Rack Availability Monitor (RAM) 116 uses the network graph and data collected by the fabric monitor 110 to compute metrics that precisely measure when a rack is experiencing a loss of redundancy, and when a rack has completely lost network connectivity. In some embodiments, the RAM 116 may use certain protocol prefixes called switched virtual interfaces (SVIs) that represent respective virtual local area networks (VLANs) that servers are attached to. In some embodiments, each ToR advertises its attached SVIs up to the spine layer. In some embodiments, the spines peer with gateway protocol server 114, which may update the fabric monitor 110 with the SVIs. In some embodiments, the SVIs may also be present in the device representations collected by the data collector 102, and thus present in the network graph formed therefrom.

In some embodiments, the RAM 116 may compare the live map of the current network topology with the network graph to determine if any SVIs are missing from any spines. A missing SVI may indicate a loss of redundancy at a rack or device in the network 120. Where an SVI is missing from all spines of a device, that device may be experiencing an outage. In some embodiments, the RAM 116 may determine a difference between configured SVIs in the network graph and advertised SVIs in the live map and identify missing SVIs. In some embodiments, these missing SVIs may then be recorded and averaged against the total uptime of the network to compute a metric concerning the effectiveness of redundancy. For example, in some embodiments, the RAM 116 may indicate the effectiveness of the redundant top of rack architecture (e.g., 30 seconds of downtime across 600+ racks and 6 months of time thus far vs many hours of cumulative loss of redundancy) to indicate the need for more or less redundancy. Thus, the RAM 116 may easily determine an optimum, efficient level of redundancy by determining the effectiveness of the present redundancy level (e.g., amount of configured SVIs) as compared to the frequency or duration of downtime of the SVIs. Reducing redundancy may decrease hardware and energy costs, while increasing redundancy may decrease downtime. Thus, the RAM 116 may optimize the balance between resource consumption and downtime by determining an increase or decrease in redundancy.

In some embodiments, the network graph from the graph builder 104 may be provided to a path tracer 118 to probe all paths between a pair of destinations. Networks, including datacenter networks, such as, e.g., layer three datacenters, may depend on redundancy in multiple ways. One such form of redundancy is Equal Cost Multipath forwarding (ECMP). In some embodiments of ECMP, a given device may have multiple redundant paths to another layer of devices in the network 120. In some embodiments, ECMP declares redundant paths to be of equal cost such that when a packet arrives at a device and is forwarded towards a destination beyond the next layer, the path may take any of the redundant paths. In some embodiments, such ECMP configurations for the devices in the network 120 facilitate enhanced resiliency and allow applications to exploit all of the bandwidth available in a network, as traffic can exercise all available paths.

However, in some embodiments, the network 120 may have many physical links, e.g., hundreds, thousand, tens of thousands or more. Thus, in some embodiments, the ECMP configuration may result in hundreds of ECMP paths between a pair of endpoints. Where any link or switch in an ECMP path between a pair of endpoints is dropping traffic, many application flows may be affected, or gray failures may occur where a switch or link sporadically and or silently drops packets. In some embodiments, therefore, identification of error-prone ECMP links facilitates resolutions such as automatically disabling the error-prone ECMP links. However, the scale and sporadic nature of gray failures may make identification difficult.

In some embodiments, to facilitate probing network switches of devices on the network 120, the path tracer 118 communicates with the network for active network probing. If repeated probes are sent across each link and device in a network and some of them are lost, a location where loss is occurring may be determined. To facilitate probing, in some embodiments, the path tracer 118 may utilize a tunneling technology, such as, e.g., IP-IP encapsulation, to facilitate placing an inner IP packet within another outer IP packet. In some embodiments, the path tracer 118 may send the outer IP packet to a device, as specified by the outer IP packet destination address. In some embodiments, once the device receives the outer IP packet, the inner IP packet is extracted and sent to a destination address of the inner IP packet. In some embodiments, before forwarding the inner IP packet to its destination address, the forwarding device sets the source address of the inner IP packet.

In some embodiments, the path tracer 118 may examine the network graph to generate a list of devices, links, and paths to probe. For example, to probe a specific link from device A to device B, the path tracer 118 generates an IP-IP encapsulated packet with the outer IP packet set to the address of device A and an inner IP packet whose destination address is the address of device B and whose source address is the address of the path tracer 118 itself. Thus, when device A receives the probe packet, device A decapsulates it and forwards the inner IP packet to the destination in the inner IP packet, e.g., device B. Upon receiving the inner IP packet, device B may analyze the probe packet, processes it, and send a reply back to source address in of the inner IP packet, which is address of the path tracer 118.

In some embodiments, to probe all ECMP paths between a pair of destinations, the path tracer 118 may use a communication protocol, such as, e.g., a user datagram protocol (UDP), a transmission control protocol (TCP) or other suitable communications protocol, and automatically vary port numbers in the packet with each probe so that all available paths are probed. To trace the hops in the path, probes are sent with incrementing Time-To-Live values that cause ECMP TTL-Expired messages to be generated and returned to the path tracer 118 at each hop. In some embodiments, the path tracer 118 may gather responses and measure loss and latency for each probe. In some embodiments, upon computing a summary of results of the losses and latencies of each packet, the path tracer 118 may generate alarms for each path with loss or increased latency to indicate which devices in the network 120 may be experiencing failures.

Accordingly, in some embodiments, the exemplary inventive network modelling system 100 provides vender and device agnostic network modelling and monitoring as a result of, in part, object bindings representing devices on the network 120 and a static map and/or model of the devices and links on the network 120. Such objects may be analyzed by components regardless of, e.g., vendor, platform, software version, hardware, or other characteristics devices and links on the network 120. Accordingly, errors and inefficiencies can be quickly and efficiently recognized and automatically addressed through the use of software principles associated with the analysis and manipulation of the object bindings to create a more stable, accurate and efficient network 120.

Figure 2:
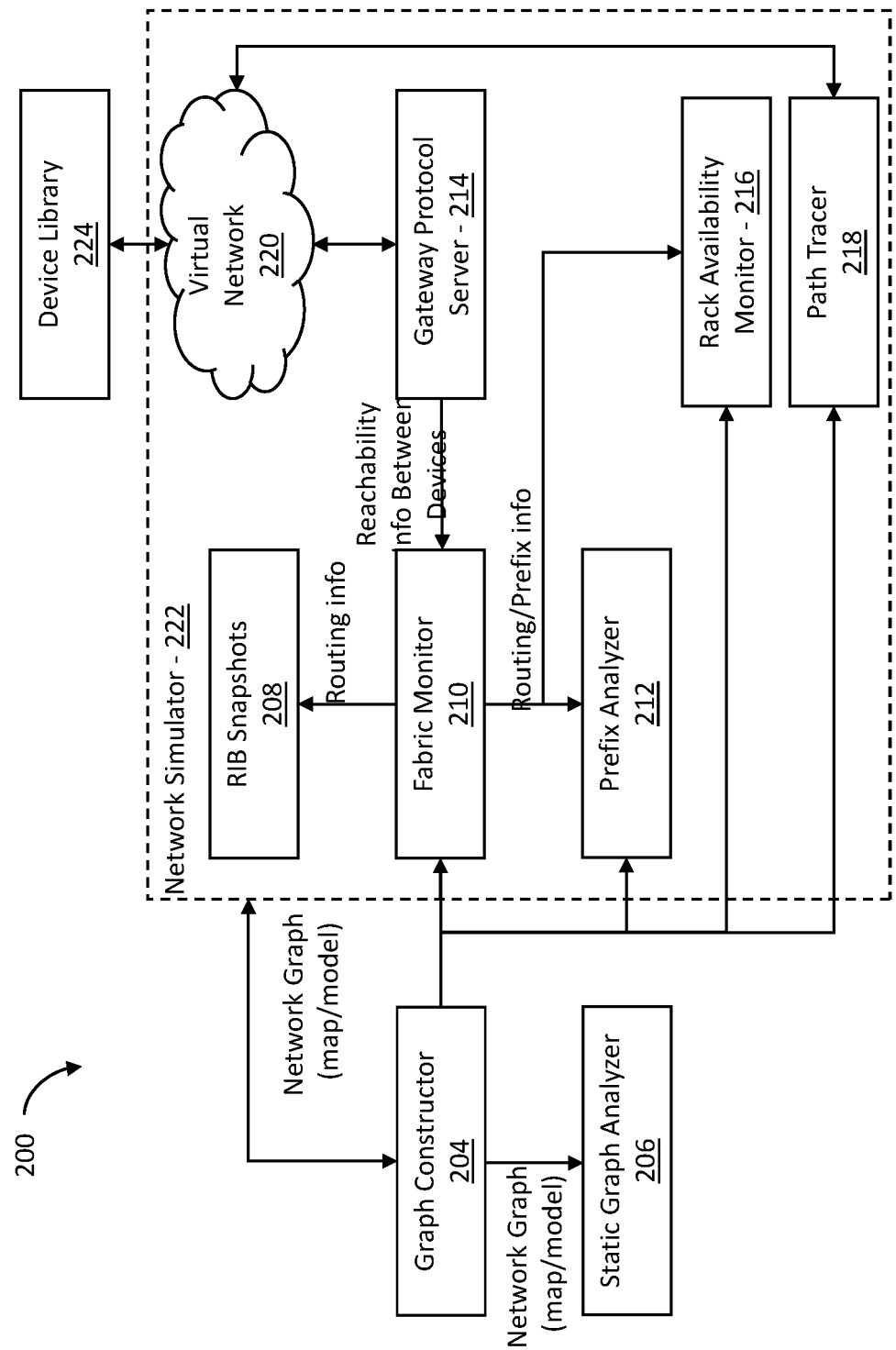

FIG. 2 illustrates a block diagram of an exemplary inventive computer-based network modelling system with object bindings for network error monitoring and visualization in accordance with one or more embodiments of the present disclosure.

In some embodiments, the exemplary inventive computer-based network modelling system 200 may test and model a network topology for implementation in a network, such as, e.g., a datacenter network, an internet-based network, an intranet network, a distributed network, or any other network of computing devices. In some embodiments, the network topology is generated, e.g., from specifications to model a new network, from data collected from an existing physical network, or from other sources, such that the network topology and possible changes can be modelled, modified, updated and tested without affecting a physical network, thus avoiding outages or other risks that may result from changes. In some embodiments, a hardware, software and vendor agnostic network model for, e.g., static topology and/or architecture, as well as live simulation, can facilitate anticipating errors and inefficiencies in a network design. Thus, in some embodiments, the exemplary inventive computer-based network modelling system 200 may employ a graph constructor 204 for constructing a network graph of network topology of a virtual network 220, as well as a fabric monitor 210 for monitoring of a live simulation for the virtual network 220.

In some embodiments, a user, such as, e.g., a network administrator, architect, or other user designing a network, may select devices for a network from a device library 224 to design an architecture for a network including, e.g., device hardware, software, platform, version, vendor, and other characteristics, as well as links and device representations. In some embodiments, the device library 224 includes a library of configuration options. In some embodiments, the user creates the device representations. In some embodiments, the user may select a variety of devices with a variety of software, hardware, vendor, platform and versions. However, in some embodiments, the user may select only devices of one type. Regardless of the devices chosen from the device library 224, the user may set the configurations, including links, security policies, routing policies, connection protocols, among other behavior configurations. Based on the user selections, a network simulator 222, including, e.g., storage devices, memory devices, processing devices, among other hardware and combinations thereof, may generate a virtual network 220. In some embodiment, the virtual network 220 may include, e.g., a system of virtual machines, each representing a device from the selected devices with the selected configurations loaded thereon. The system of virtual machines may be loaded into a storage device or devices associated with the network simulator 222 and orchestrated by the network simulator 222 to perform processes and instructions using the processing devices associated with the network simulator 222. Thus, in some embodiments, the network simulator 222 may instantiate a virtual analog of each device of a network according to a user selected network architecture into, e.g., a server or cloud environment, or from a simulation of a physical network in production at, e.g., a datacenter or other physical location. In some embodiment, the virtual network 220 may include, e.g., tens, hundreds, thousands or more virtual devices instantiated with virtual machines in the virtual environment of the network simulator 222. Thus, in some embodiments, the virtual network 220 may behave in a virtual environment in a fashion analogous to how the associated physical devices would behave in a physical network. As a result, the virtual network 220 can be tested and monitored in a manner similar to a physical network.

In some embodiments, some or all of the virtual devices of the virtual network 220 may form nodes, such as routing nodes to propagating information throughout the virtual network 220. The virtual devices may route virtual communications to other virtual devices on the network according to a configuration defining, e.g., links to other nodes, routing policies regarding how routing and forwarding is performed, routing protocols to be used, header structures for packets, advertising policies, among other configurations. In some embodiments, a node may advertise routes according to a configuration using, e.g., header prefixes. Many of the configuration elements may be defined according to network invariants.

In some embodiments, the graph constructor 204 may receive the virtual network 220 from the network simulator 222 including, e.g., simulation data pertaining to, e.g., the network topology. In some embodiments, the graph constructor 204 may produce a network graph that models the network topology simulated by the network simulator 222. Using the model, the graph constructor 204 may use the model to identify artifacts pertaining to virtual device operations and derive configurations, state information, link information, among other information to establish a virtual device representation of each virtual device in the virtual network 220. However, in some embodiments, the virtual network 220 is a simulation of a pre-existing physical network such that the graph constructor 204 may also, or alternatively, collect device representations, state information and link information from the physical network.

In some embodiments, the graph constructor 204 may normalize the virtual device representation into, e.g., a vendor neutral, platform neutral and/or version neutral form. In some embodiments, the normalization may be performed using parser functions for translating the artifacts from vendor, platform and/or version specific format into a modelling system format that is vendor, platform and/or version neutral. However, in some embodiments, because the virtual devices are selected from the device library 224, the graph constructor 204 may access pre-normalized virtual device representations from the network simulator 222 that are loaded upon instantiation of the virtual network 220. In some embodiments, the normalized virtual device representations may set forth configuration data for each virtual device, including, e.g., nodes, links and/or routing policies. As such, in some embodiments the normalized virtual device representations may include at least one node configuration, at least one link configuration, at least one routing policy configuration, at least one state and combinations thereof for each node at which a virtual device resides.

Because the device representations include details as to a respective node, each link to another node and one or more policies defining device connection protocols for each link, the collection of normalized configurations can be assembled into a detailed map or model of each node and each link between nodes in the virtual network 220. In some embodiments, the static map or model of the virtual network 220 reflects a static map of nodes, states, links and/or policies across the virtual network 220 based on the artifacts from which virtual device representations were derived. Thus, in some embodiments, the graph constructor 204 may employ vendor, hardware and software neutral virtual device representations to generate a map and/or model of the virtual network 220 that reflects a static architecture or topology of the virtual network 220.

In some embodiments, the graph constructor 204 may transforms the, e.g., static network map or static network model into a network graph. In some embodiments, the network graph is a software object bound to the static map and/or model. In some embodiments, an object binding facilitates interaction with the static map and/or model in a way that reflects the natural hierarchy of a network, such as a datacenter network. The object binding may be implemented in a software language such as, but not limited to, e.g., Python, Java, C, C++, or other language, including object-oriented languages. Thus, the object binding can represent the static map and/or model using idioms associated with the language such that a user, such as, e.g., a programmer, engineer, administrator or other user may treat the object binding as a software object to be manipulated and modified using software engineering practices. Such software engineering practices may include testing, continuous integration/continuous deployment, version control and other software engineering methodologies and techniques in a way that affects and improves the operation of the virtual network 220. Thus, in some embodiments, the graph constructor 204 can model the virtual network 220 using the static map and/or model of the normalized virtual device representations that is non-specific to vendor, platform, software version, or even hardware. The resulting network graph is therefore applicable across different datacenter architectures to validate properties and characteristics of the virtual network 220 without concern for, e.g., vendor, platform, software version, or even hardware.

In some embodiments, the network graph may be produced by reading the normalized configuration data and using object bindings for, e.g., nodes, links, policies, among other attributes, to build the model of the virtual network 220 with nodes, links, and policy defining how routing/ forwarding works on the network/node. In some embodiments, the resulting model is then serialized as an object to produce the network graph and stored, e.g., on a storage device, in a database, or in other storage location. In some embodiments, the model is expressed in a data modelling language, such as, e.g., Yet Another Next Generation (YANG), or other suitable data modelling language. In some embodiments, the model may then be serialized to facilitate communication or storage or both of the model. For example, the model may be serialized using, e.g. pickling for Python, serializable for Java, serialize with PHP, or other serialization functions. In some embodiments, the model is serialized into, e.g., a Javascript object notation (JSON)

object, an extensible markup language (XML) object, a YAML object, or other object.

In some embodiments, the network graph is used to analyze the topology and performance of the virtual network 220. Because the network graph includes an object that is representative of the network map and/or model, the network graph may represent networks having any combination of, e.g., vendor, software version, platform, etc., for analysis, error tracking, routing monitoring, configuration error monitoring, configuration inefficiencies and duplication, among other aspects for identification of areas of improvement.

In some embodiments, a static graph analyzer 206 may receive the network graph to analyze the static network map and/or model. In some embodiments, the virtual network 220 may have tens, hundreds, thousands or more nodes and tens, hundreds, thousands, ten thousands or more links. Therefore, the virtual network 220 may function correctly under normal conditions while still including inconsistencies that lead to performance problems or even outages under expected failure conditions such as, e.g., node reboots, link failures, software upgrade, and maintenances, each of which may be simulated by the network simulator 222 to test the virtual network 220. Moreover, the virtual network 220 may include an architecture with certain properties or invariants that need to be satisfied in order for the network to function correctly under both normal and expected failure conditions. In some embodiments, the static network map and/or model may include data regarding the properties and invariants, and the network graph of the static network map and/or model, as a software object, may express the properties and invariants in code.

In some embodiments, the static graph analyzer 206 may run code corresponding to defined properties and invariants dictating operation of a network against the properties of the network graph. In so doing, the static graph analyzer 206 may find and remediate errors and inconsistencies in the network, preventing outages and ensuring correct operation. For example, in some embodiments, the static network graph 206 may run code defining internet protocol (IP) address configuration rules (e.g., each device having a unique IP address), node redundancy rules, configuration verification rules such as, e.g., ensuring the redundant nodes are identical configurations including identical routing, confirming that the proper version of software is installed and running, among other network invariant rules. In some embodiments, the code may employ functions for checking a software object for properties having the invariants and rules described above, among other invariants. In some embodiments, therefore, by running the code for the invariants against the network graph, the code may check the object that is the network graph representing the static network map and/or model for errors and inconsistencies in the invariants dictating network functioning under both normal and expected failure conditions. Thus, in some embodiments, the static graph analyzer 206 may automatically identify errors and inconsistencies in the network graph, due, in part, to the ability to analyze the network graph as a software object using coded invariants for debugging the virtual network 220.

In some embodiments, the network graph may be employed for live network monitoring by, e.g., comparing the static network graph with live updates from the virtual network 220. In some embodiments, this comparison is performed by a fabric monitor 210 that subscribes to network updates. In some embodiments, the fabric monitor 210 builds out an expected routing topology based on the network graph by, e.g., translating the network graph object into an arrangement of the nodes in the virtual network 220 based on the virtual devices and links defined in the network graph.

In some embodiments, a gateway protocol server 214 collects the network updates from the virtual network 220 using, e.g., peering sessions with each virtual device on the virtual network 220. In some embodiments, based on the network graph, gateway protocol configurations are pushed to the devices on the virtual network 220. In some embodiments, the gateway protocol configurations are provided to each device, however in other embodiments, a subset of the devices may be provided with the gateway protocol configurations. In some embodiments, the gateway protocol configurations instruct each virtual device to engage in a routing protocol peering session with an instance of a gateway protocol running on a dedicated server, such as, e.g., a gateway protocol server 214. In some embodiments, the network simulator 222 may vary the conditions of the virtual network 220, such as, e.g., simulating outage conditions, simulating device failures, simulating varying communication loads, etc. As routing changes in the virtual network 220, updates are relayed to the gateway protocol server 214 via the routing protocol peering sessions. Thus, each virtual device may report its respective routing status to the gateway protocol server 214, including, e.g., protocol prefixes, a current routing status including live links to other virtual devices in the virtual network 220 and reachability information between virtual devices. Herein, the protocol prefixes refer to an address identifier for a route such as, e.g., an internet protocol address and/or bit-length, among other address identifiers. Thus, as conditions are varied, the gateway protocol server 214 may receive updates reflecting the variations in the virtual network 220 in a way that simulates variations in a physical network.

In some embodiments, each virtual device on the virtual network 220 advertises all routes that it carries using, e.g., the protocol prefix updates. The collection of routes carried by each virtual device may be referred to as routing information base (RIB). In some embodiments, the RIB is advertised by each virtual device on the virtual network 220 to the gateway protocol server 214 across the respective routing protocol peering sessions. In some embodiments, the gateway protocol server 214 may collect the RIB for all of the virtual devices on the virtual network 220 and provide it to the fabric monitor 210 along with the status updates.

In some embodiments, the updates are relayed from the gateway protocol server 214 to the fabric monitor 210. In some embodiments, the gateway protocol may include a suitable gateway protocol for peering and receiving routing updates at a server, such as, e.g., a border gateway protocol (BGP).

In some embodiments, by comparing the updates from the gateway protocol server 214 with the topology from the network graph, the fabric monitor 210 may correlate reachability information between virtual devices with specific configured links. As a result, in some embodiments, the fabric monitor 210 may determine link status, advertised routes including RIB, and/or reachability status (e.g., up/down state) of each link with each update from the gateway protocol server 214 to determine a current topologic state of the virtual network 220 based on the most recent updates. Thus, as the network simulator 222 simulates various network conditions, including both normal and extreme or unexpected conditions, the fabric monitor 210 may assess the live state of the virtual network 220 in response to the conditions before the network is physically implemented.

In some embodiments, the current topological state of the network is presented in a visualization that updates in real-time, e.g., concurrently with each gateway protocol server 214 update and each device update via the routing protocol peering sessions. In some embodiments, the fabric monitor 210 also records every state change and route advertisement change, so that it is possible to visually replay the state of the network during past events. This is a valuable tool for post-mortem analysis of simulated adverse network events. Accordingly, the current topological state may be used to determine errors or causes of errors to the virtual network 220 to assess the robustness of the selected configurations, devices and architecture of the virtual network 220 before physically implementing a network. In some embodiments, the current topological state may be constructed as a live map of the topological state of the virtual network 220 for quick, efficient and accurate visualization by a user and/or administrator. In some embodiments, the live map may include, e.g., link status, reachability status, and/or protocol prefix data for each device, updated with the latest advertised data by the gateway protocol server 214.

Additionally, the live map of the current topological state, including at least the RIB, may be stored with each update in an RIB snapshots version control system (VCS) 208. In some embodiments, the entire network 120 RIB is snapshotted or stored in RIB snapshots VCS 208 with each update. In some embodiments, the change in the topological state is stored in RIB snapshots VCS 208. In some embodiments, the stored changes in the topological state may be used to recreate a previous live map. In some embodiments, by storing each change in RIB snapshots VCS 208 or automatically snapshotting the entire virtual network 220 RIB before and after each change and storing it in RIB snapshots VCS 208, how a particular change affects virtual network 220 routing may be quickly and precisely determined by viewing the snapshotted or recreated live map of the RIB after updating due to the change. Thus, in some embodiments, where an adverse event is simulated, the RIB snapshots in the RIB snapshots VCS 208 provides a tool that facilitates tracking how routing in the virtual network 220 changes over time, both before and after the simulated event. Thus, the RIB snapshots in the RIB snapshots VCS 208 facilitate post-mortem analysis for the event to determine a root cause of the event and assess the robustness of the design of the virtual network 220 before physically implementing the design in a network.

In some embodiments, the fabric monitor 210 updates the status and RIB of each link with each update from the gateway protocol server 214. In some embodiments, the gateway protocol server 214 may receive updates from each virtual device on a periodic basis, such as, e.g., every minute, every hour, every day, or by any other period. In some embodiments, the gateway protocol server 214 may monitor the virtual devices for continual updates upon each change in reachability and/or routing status of each virtual device resulting in a constant, real-time stream of status updates. In some embodiments, the gateway protocol server 214 may provide the latest updates from the virtual devices in the virtual network 220 concurrently with receiving the updates. In some embodiments, the gateway protocol server 214 may provide the fabric monitor 210 with updates on a periodic basis, such as, every minute, every hour, every day, or by any other period. The update periods by the devices and by the gateway protocol server 214 may be the same or different.

In some embodiments, the fabric monitor 210 may provide the current topological state of the network, including current protocol prefixes advertised by the virtual devices of the virtual network 220, to a prefix analyzer 212. Efficient and error-free operation of the virtual network 220 may be facilitated by adhering to network invariants, such as those described above, to ensure correct operation. Similar to the static graph analyzer 206, the prefix analyzer 212, in some embodiments, may express the invariants in code based on the network graph and its object binding. The prefix analyzer 212 may then run the invariants against the protocol prefixes from the fabric monitor 210. As described above, the protocol prefixes may include routing information, such as address identifiers for routing. Each update from the virtual devices on the virtual network 220 may advertise protocol prefixes for the routes configured for each respective virtual device. In some embodiments, the prefix analyzer 212 uses the prefixes and the coded invariants to identify and report, e.g., statistics, errors, and inconsistencies with routing during network operation. In some embodiments, critical errors can be used as the basis for automated alerting and remediation, as well as for anticipating likely failures in a physical network bearing a design similar to the design of the virtual network 220. Thus, a user may optimize the network design prior to implementing a physical network. In some embodiments, the prefix analyzer 212 may rerun the prefix analysis whenever advertisements across the routing protocol peering sessions change.

In some embodiments, the configured routes of each virtual device may include aggregate routes configured by an aggregate configuration. An aggregate route is a route advertised by a device in a routing protocol peering session that replaces advertisements of one or more more specific routes with a broader advertisement. For example, where the routing protocol peering session is advertising routes such as, e.g., 20.253.0.1/32, 20.253.0.2/32, . . . 20.253.0.254, if the aggregate 20.253.0.0/24 is configured, then instead of advertising 20.253.0.1/32, 20.253.0.2/32, . . . 20.253.0.254, the routing protocol peering session advertises the single route 20.253.0.0/24. In some embodiments, aggregates may be useful by resulting result in fewer BGP routes and hide routing churn in the more specific routes, thus increasing efficiency of the virtual network 220. However, in some embodiments, aggregates are not advertised unless there is a more specific route in the routing protocol. Thus, in some embodiments, where an aggregate route fails to include any specific routes, the aggregate route is not advertised. Such an unadvertised but configured aggregate route may be deemed a sleeping aggregate.

In some embodiments, the virtual network 220 may be constructed with multiple routing layers. Lower layers of such a construction may refer to specific routes (e.g., individual node-to-node routes), while successively higher layers from aggregates of the specific routes. In some embodiments, nodes may advertise the highest layer of routes so that the specific routes may be consolidated to reduce the size of, e.g., routing tables maintained at the gateway protocol server 214. Routing may then be performed first according to aggregate routes based on a selected source and destination, and the nodes may then determine specific routes within the aggregate routes. However, in some cases, sleeping aggregate routes may be caused by aggregate routes being mistakenly configured by an incorrect aggregate configuration at two layers of the virtual network 220. The aggregate route at the lower layer becomes active, but the aggregate route at the higher layer will be sleeping, since the aggregate route at the lower layer is hiding the more specific routes. In some embodiments, a sleeping aggregate route could be activated incorrectly, resulting in traffic routing to an associated device via the aggregate route being dropped as the more specific routes are hidden by the aggregate route at the lower layer. Accordingly, sleeping aggregate routes risk routing errors and routing inefficiencies.

Sleeping aggregates are usually a result of an incomplete network migration. Inadvertent activation of a sleeping aggregate can happen if a route advertisement leaks onto the switch with the sleeping aggregate. Leaked static host routes (i.e., static routes with prefix length 32) are a frequent cause as they will always cause a larger aggregate to activate. In some embodiments, the network simulator 222 may simulate such failures and errors to test the robustness of the design and architecture of the virtual network 220.

In some embodiments, the fabric monitor 210 has visibility into all routing advertisements while the graph constructor 204 collects the configured aggregate routes from virtual devices in the virtual network 220. By comparing the configured prefixes, including the configured aggregate routes, mapped and/or modelled in the network graph and the advertised prefixes received and mapped by the fabric monitor 210, the prefix analyzer 212 may compare configured aggregate routes versus advertised aggregate routes. In some embodiments, the prefix analyzer 212 may identify sleeping aggregates in the virtual network 220 based on the configured aggregates that are not being advertised. In some embodiments, once identified, the sleeping aggregates can be removed from virtual devices where they are incorrectly configured, thus improving performance and reducing errors in communication across the virtual network 220. In combination with the RIB snapshots VCS 208, the detection of the sleeping aggregates may, in some embodiments, facilitate determining the root cause of the sleeping aggregates such that the user may design a physical network to avoid such root causes before implementing the physical network itself.

In some embodiments, the routing prefix information, such as, e.g., the live map and/or a list or table of routing protocol prefixes, may be supplied to a rack availability monitor 216 along with the network graph from the graph constructor 204. In some embodiments, virtual servers instantiated in, e.g., virtual machines of the network simulator 222 environment, and deployed as virtual racks containing many virtual servers, such as, e.g., up to 96 servers. A virtual rack may contain at least one Top of Rack (ToR) switch to provide external virtual network 220 connectivity. In some embodiments, if applications running on virtual servers in the virtual rack require a high degree of network availability, two ToRs will be deployed in the virtual rack and virtual servers will have redundant connections to each ToR. In some embodiments, the ToRs connect up to a layer of switches called spines which themselves are multiply redundant and aggregate connections from many ToR racks. In some embodiments, the network simulator 222 may simulate multiple combinations of virtual server, virtual rack, and ToR arrangements in the virtual network 220 to facilitate assessing the optimal arrangements for a physical network of a same design and architecture.

In some embodiments, the Rack Availability Monitor (RAM) 216 uses the network graph and data collected by the fabric monitor 210 to compute metrics that precisely measure when a virtual rack is experiencing a loss of redundancy, and when a virtual rack has completely lost network connectivity. In some embodiments, the RAM 216 may use certain protocol prefixes called switched virtual interfaces (SVIs) that represent respective virtual local area networks (VLANs) that servers are attached to. In some embodiments, each ToR advertises its attached SVIs up to the spine layer.

In some embodiments, the spines peer with gateway protocol server 214, which may update the fabric monitor 210 with the SVIs. In some embodiments, the SVIs may also be present in the virtual device representations collected by the graph constructor 204, and thus present in the network graph formed therefrom.

In some embodiments, the RAM 216 may compare the live map of the current virtual network topology with the network graph to determine if any SVIs are missing from any spines. A missing SVI may indicate a loss of redundancy at a virtual rack or virtual device in the virtual network 220. Where an SVI is missing from all spines of a virtual device, that virtual device may be experiencing an outage. In some embodiments, the RAM 216 may determine a difference between configured SVIs in the network graph and advertised SVIs in the live map and identify missing SVIs. In some embodiments, these missing SVIs may then be recorded and averaged against the total uptime of the network to compute a metric concerning the effectiveness of redundancy based on the simulated conditions by the network simulator 222. For example, in some embodiments, the RAM 216 may indicate the effectiveness of the redundant top of rack architecture (e.g., 30 seconds of downtime across 600+ racks and 6 months of time thus far vs many hours of cumulative loss of redundancy) to indicate the need for more or less redundancy. Thus, the RAM 216 may easily determine an optimum, efficient level of redundancy by determining the effectiveness of the present redundancy level (e.g., amount of configured SVIs) as compared to the frequency or duration of downtime of the SVIs. Reducing redundancy may decrease hardware and energy costs in a physical system, while increasing redundancy may decrease downtime in the physical system. Thus, the RAM 216 may optimize the balance between resource consumption and downtime by determining an increase or decrease in redundancy in a simulated environment before investment into a physical network. Thus, the physical network may then be designed according to the optimal redundancy level ascertained by the RAM 216.

In some embodiments, the network graph from the graph constructor 204 may be provided to a path tracer 218 to probe all paths between a pair of destinations. Networks, including datacenter networks, such as, e.g., layer three datacenters, may depend on redundancy in multiple ways. One such form of redundancy is Equal Cost Multipath forwarding (ECMP). In some embodiments of ECMP, a given device may have multiple redundant paths to another layer of devices in the virtual network 220. In some embodiments, ECMP declares redundant paths to be of equal cost such that when a packet arrives at a device and is forwarded towards a destination beyond the next layer, the path may take any of the redundant paths. In some embodiments, such ECMP configurations of the virtual devices in the virtual network 220 facilitate enhanced resiliency and allow applications to exploit all of the bandwidth available in a network, as traffic can exercise all available paths.

However, in some embodiments, the virtual network 220 may have many physical links, e.g., hundreds, thousand, tens of thousands or more. Thus, in some embodiments, the ECMP configuration may result in hundreds of ECMP paths between a pair of endpoints. Where any link or switch in an ECMP path between a pair of endpoints is dropping traffic, many application flows may be affected, or gray failures may occur where a switch or link sporadically and or silently drops packets. In some embodiments, therefore, identification of error-prone ECMP links facilitates resolutions such as automatically disabling the error-prone ECMP links. However, the scale and sporadic nature of gray failures may make identification difficult.

In some embodiments, to facilitate probing network switches of virtual devices on the virtual network 220, the path tracer 218 communicates with the virtual network 220 for active network probing. If repeated probes are sent across each link and device in a network and some of them are lost, a location where loss is occurring may be determined. To facilitate probing, in some embodiments, the path tracer 218 may utilize a tunneling technology, such as, e.g., IP-IP encapsulation, to facilitate placing an inner IP packet within another outer IP packet. In some embodiments, the path tracer 218 may send the outer IP packet to a virtual device, as specified by the outer IP packet destination address. In some embodiments, once the virtual device receives the outer IP packet, the inner IP packet is extracted and sent to a destination address of the inner IP packet. In some embodiments, before forwarding the inner IP packet to its destination address, the forwarding virtual device sets the source address of the inner IP packet.

In some embodiments, the path tracer 218 may examine the network graph to generate a list of virtual devices, links, and paths to probe. For example, to probe a specific link from virtual device A to virtual device B, the path tracer 218 generates an IP-IP encapsulated packet with the outer IP packet set to the address of virtual device A and an inner IP packet whose destination address is the address of virtual device B and whose source address is the address of the path tracer 218 itself. Thus, when virtual device A receives the probe packet, virtual device A decapsulates it and forwards the inner IP packet to the destination in the inner IP packet, e.g., virtual device B. Upon receiving the inner IP packet, virtual device B may analyze the probe packet, processes it, and send a reply back to source address in of the inner IP packet, which is address of the path tracer 218.

In some embodiments, to probe all ECMP paths between a pair of destinations, the path tracer 218 may use a communication protocol, such as, e.g., a user datagram protocol (UDP), a transmission control protocol (TCP) or other suitable communications protocol, and automatically vary port numbers in the packet with each probe so that all available paths are probed. In some embodiments, to trace the hops in the path, probes are sent with incrementing Time-To-Live values that cause ECMP TTL-Expired messages to be generated and returned to the path tracer 218 at each hop. In some embodiments, the path tracer 218 may gather responses and measure loss and latency for each probe. In some embodiments, upon computing a summary of results of the losses and latencies of each packet, the path tracer 218 may generate alarms for each path with loss or increased latency to indicate which devices in the virtual network 220 may be experiencing failures. Such information may be used to improve the design of the virtual network 220 and a subsequent physical network to prevent such losses and failures, thus increasing the robustness and efficiency of the physical network.

Accordingly, in some embodiments, the exemplary inventive network modelling system 200 provides vender and device agnostic network modelling and monitoring as a result of, in part, object bindings representing devices on the virtual network 220 and a static map and/or model of the virtual devices and links on the virtual network 220. Such objects may be analyzed by components regardless of, e.g., vendor, platform, software version, hardware, or other characteristics of virtual devices and links on the virtual network 220. Accordingly, errors and inefficiencies can be quickly and efficiently recognized prior to investment of time and resources into building a physical network. In some embodiments, the network simulator 222 may then produce a collection of correct and valid device representations on the virtual network 220 that implement the architecture of the virtual network 220 while satisfying the network invariants according to the path tracer 218, the prefix analyzer 212 and other functions. In some embodiments, the network simulator 222 may also produce faults, errors, or inefficiencies resulting from configurations such that a recommended design can be formulated that implements the architecture of the virtual network 220 while satisfying the network invariants, such as, e.g., selecting a design from a plurality of simulated designs exhibiting the greatest level of efficiency with the least amount of losses and errors in the virtual network 220. Thus, the resulting physical network may be made more efficient, resilient and robust.

Figure 3:
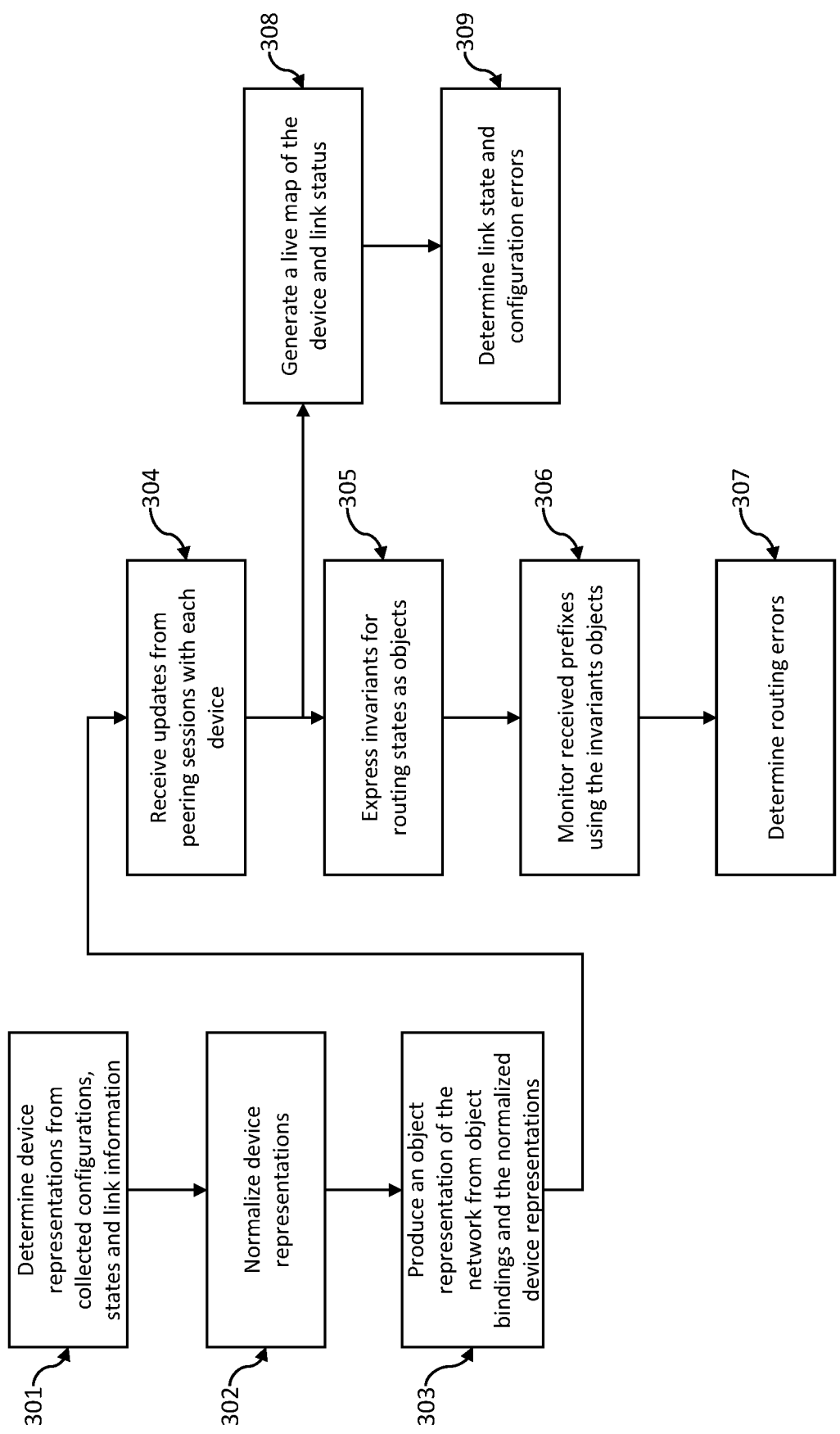

FIG. 3 illustrates a flowchart of an exemplary inventive methodology of network modelling with object bindings for error correction in accordance with one or more embodiments of the present disclosure.

In some embodiments, a network may be modelled using object bindings to track and mitigate errors and inefficiencies in a network. Some embodiments of an exemplary inventive network modelling methodology includes, at block 301, determining, by at least one processor, a device representation of each device of a plurality of devices on a network. In some embodiments, the device representations may be obtained by, e.g., a data collector in communication with the network and configured to query each device for a corresponding configuration, state and link data.

In some embodiment, the device representations may be normalized, at block 302, to determine normalized device representations that are presented in, e.g., a vendor, platform, software version, etc. neutral format. In some embodiments, the normalized device representations are determined using a library of device representation parser functions. In some embodiments, the normalized device representations include a node associated with a respective device of the plurality of devices, a policy for device connection protocols associated with the respective device, and one or more links associated with the respective device of the plurality of devices, where each link is formed by an electronic connection between the respective device and another device of the network, a state of each respective device of the plurality of devices, among other data.

In some embodiments, the normalized device representations and associated object bindings are used to produce an object representation of the schema forming the network model at block 303. In some embodiments, the object bindings include a software code, or idiomatic, representation of device data represented by the normalized device representations, such as, e.g., configurations, states, links, interfaces, addresses, among other data. The normalized device representations, when organized into a schema such as in, e.g., YANG, may form a network model. In some embodiments, object bindings, expressed in, e.g., pyangbind in Python, or other binding function in a suitable programming language, may be associated with the schema. Using the object bindings with the data of the normalized device representations, the schema may be expressed as with an object representation that may be manipulated using idiomatic language constructs, e.g., Python constructs, Java constructs, or other programming language.

In some embodiments, the object representation of the network schema may described the static state of the network. In some embodiments, the object representation may be produced in a suitable programming language, such as a database language including, e.g., JSON, XML, or other suitable language. In some embodiments, the static network model includes, e.g., a static network map of the network based on each node, each link and each policy associated with each normalized device representation of the at least one device of the plurality of devices.

In some embodiments, a routing protocol peering session is established between each device of the network and a routing protocol server at block 304 such that the routing protocol server receives updates from each peering session with each device. In some embodiments, the updates include advertised routing protocol prefixes from each device, including, e.g., routing addresses associated with each link.

In some embodiments, a live map is generated at block 308 from the updates from each device for device and link statuses. In some embodiments, the live map is formed upon determining a status of each device and each link of each device based on the updates from each routing protocol peering session.

In some embodiments, the link states and any configuration errors may be determined, at block 309, based on the protocol prefix updates. In some embodiments, the live map of the protocol prefix updates are compared to the static network map, model and/or graph to determine differences between a current operation state of the network and a network topology. The differences may used to infer which links are operational and which are failed to determine network and configuration failures and inefficiencies.

Additionally, in some embodiments, invariants for routing states for efficient and stable operation of the network may be expressed as code objects at block 305.

In some embodiments, the protocol prefix updates may be compared against the invariants objects at block 306. In some embodiments, the objects may be code objects that are executable to check for the presence of the invariants in subject data. In some embodiments, the protocol prefix updates may be the subject data such that upon running the invariants objects, conditions of the protocol prefix updates are checked to determine a presence of the invariants.

In some embodiments, based on the comparison of the invariants objects to the protocol prefix updates, routing errors may be determined at block 307.

In some embodiments, the link states, configuration errors and routing errors may be logged and recorded in, e.g., a snapshot of the network on a periodic basis. For example, with each routing protocol update, a new snapshot can be produced for the resulting set of errors and states. In some embodiments, the snapshots may include a routing information base for each of the devices, including, e.g., the status of each device and status of each link based on the routing protocol updates.

Figure 4:
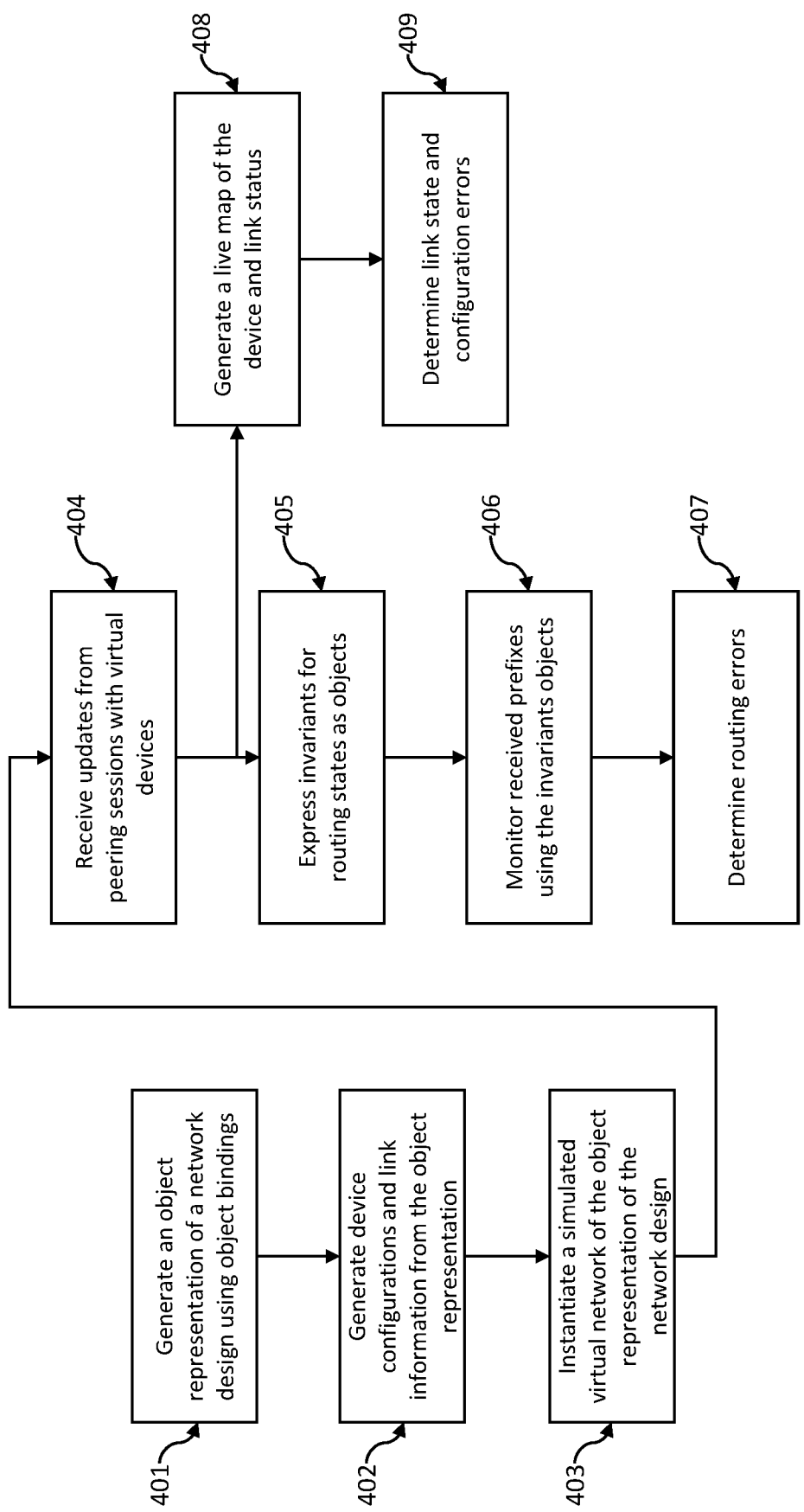

FIG. 4 illustrates a flowchart of an exemplary inventive methodology of network modelling with object bindings for network architecture design and testing in accordance with one or more embodiments of the present disclosure.

In some embodiments, a network may be modelled using object bindings to track and mitigate errors and inefficiencies in a network. Some embodiments of an exemplary inventive network modelling methodology includes, at block 401, implementing object bindings for each device and the network to create an object representation of a network according to a desired architecture.

In some embodiments, device representations and link information are generated according to the object representation of the network at block 402. In some embodiments, the device representations include a node associated with a respective device of the plurality of devices, a policy for device connection protocols associated with the respective device, and one or more links associated with the respective device of the plurality of devices, where each link is formed by a simulated connection between the respective virtual device and another virtual device of the virtual network.

In some embodiments, a virtual network is created from the object representation of the network and the device representations for each node in the network at block 403. In some embodiments, the virtual network simulates the desired network according to the object representation network design, including virtual devices representing, e.g., a selection of physical devices, including, e.g., vendor, hardware, software, and/or software version.

In some embodiments, using the object bindings from the object representation for each device representation and link information forms a static network model of the virtual network. In some embodiments, the static network model includes, e.g., a static network map of the virtual network based on each node, each link and each policy associated with each device representation of the at least one device of the plurality of virtual devices.

In some embodiments, a routing protocol peering session is established between each virtual device of the virtual network and a routing protocol server at block 404 such that the routing protocol server receives updates from each peering session with each virtual device. In some embodiments, the updates include advertised routing protocol prefixes from each virtual device, including, e.g., routing addresses associated with each link.

In some embodiments, a live map is generated at block 408 from the updates from each virtual device for virtual device and link statuses. In some embodiments, the live map is formed upon determining a status of each virtual device and each link of each virtual device based on the updates from each routing protocol peering session.

In some embodiments, the link states and any configuration errors may be determined, at block 409, based on the protocol prefix updates. In some embodiments, the live map of the protocol prefix updates are compared to the static virtual network map, model and/or graph to determine differences between a current operation state of the virtual network and a virtual network topology. The differences may be used to infer which links are operational and which are failed to determine virtual network and configuration failures and inefficiencies.

Additionally, in some embodiments, invariants for routing states for efficient and stable operation of the virtual network may be expressed as code objects at block 405.

In some embodiments, the protocol prefix updates may be compared against the invariants objects at block 406. In some embodiments, the objects may be code objects that are executable to check for the presence of the invariants in subject data. In some embodiments, the protocol prefix updates may be the subject data such that upon running the invariants objects, conditions of the protocol prefix updates are checked to determine a presence of the invariants.

In some embodiments, based on the comparison of the invariants objects to the protocol prefix updates, routing errors may be determined at block 407.

In some embodiments, the link states, configuration errors and routing errors may be logged and recorded in, e.g., a snapshot of the virtual network on a periodic basis. For example, with each routing protocol update, a new snapshot can be produced for the resulting set of errors and states. In some embodiments, the snapshots may include a routing information base for each of the virtual devices, including, e.g., the status of each virtual device and status of each link based on the routing protocol updates. Inefficiencies and failure points in a network architecture associated with the network design may be easily and efficiently deduced to produce a physical network with an optimal set of configurations and devices to reduce down-time, failures, and inefficiencies.

Figure 5:
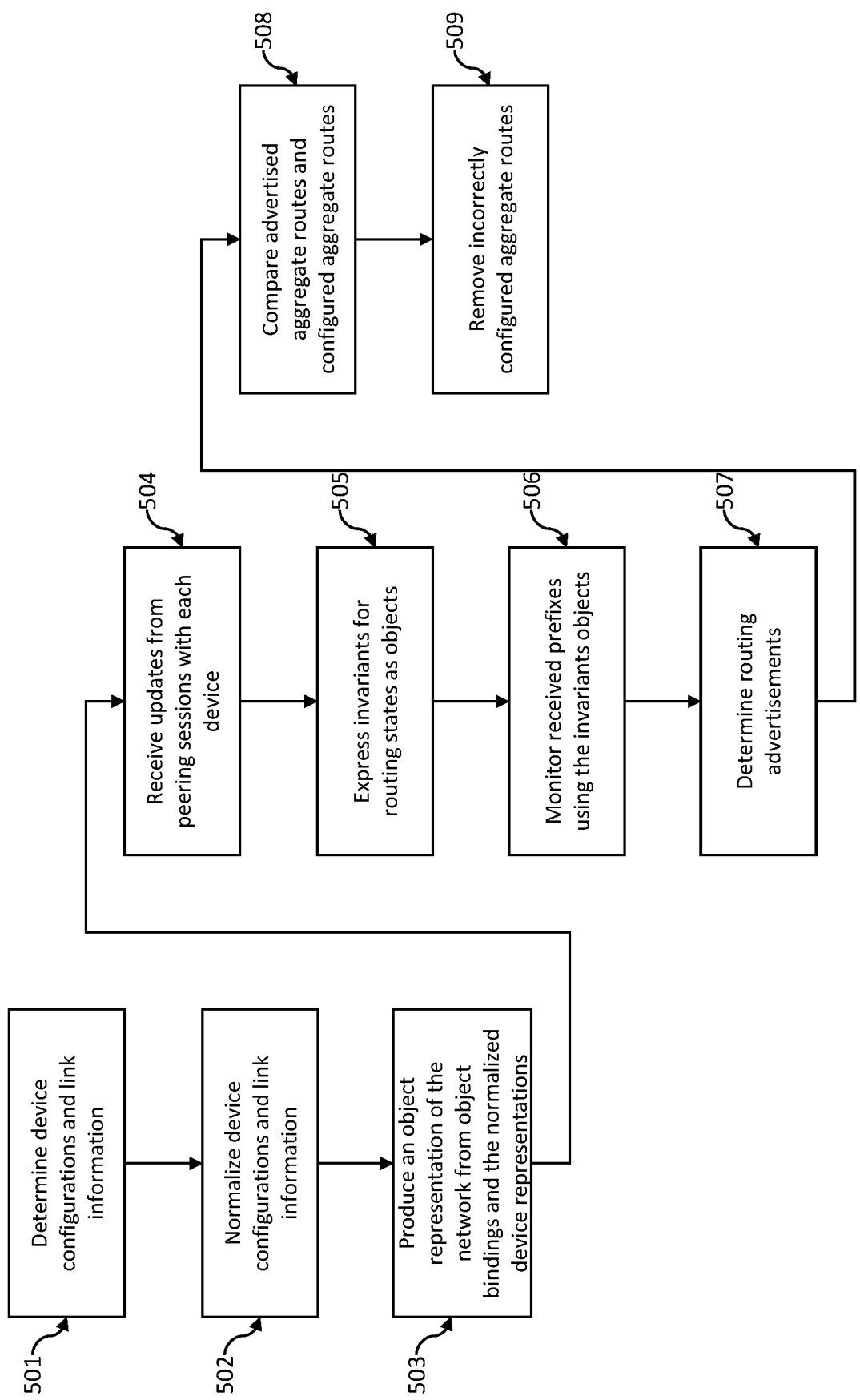

FIG. 5 illustrates a flowchart of an exemplary inventive methodology of network modelling with object bindings for aggregate route configuration and optimization in accordance with one or more embodiments of the present disclosure.

In some embodiments, a network may be modelled using object bindings to track and mitigate errors and inefficiencies in a network. Some embodiments of an exemplary inventive network modelling methodology includes, at block 501, determining, by at least one processor, a device representation of each device of a plurality of devices on a network. In some embodiments, the device representations may be obtained by, e.g., a data collector in communication with the network and configured to query each device for a corresponding configuration, state and link data.

In some embodiment, the device representations may be normalized, at block 502, to determine normalized device representations that are presented in, e.g., a vendor, platform, software version, etc. neutral format. In some embodiments, the normalized device representations are determined using a library of device representation parser functions. In some embodiments, the normalized device representations include a node associated with a respective device of the plurality of devices, a policy for device connection protocols associated with the respective device, and one or more links associated with the respective device of the plurality of devices, where each link is formed by an electronic connection between the respective device and another device of the network, a state of each respective device of the plurality of devices, among other data.

In some embodiments, the normalized device representations and associated object bindings are used to produce an object representation of the schema forming the network model at block 503. In some embodiments, the object bindings include a software code, or idiomatic, representation of device data represented by the normalized device representations, such as, e.g., configurations, states, links, interfaces, addresses, among other data. The normalized device representations, when organized into a schema such as in, e.g., YANG, may form a network model. In some embodiments, object bindings, expressed in, e.g., pyangbind in Python, or other binding function in a suitable programming language, may be associated with the schema. Using the object bindings with the data of the normalized device representations, the schema may be expressed as with an object representation that may be manipulated using idiomatic language constructs, e.g., Python constructs, Java constructs, or other programming language.

In some embodiments, the object representation of the network schema may describe the static state of the network. In some embodiments, the object representation may be produced in a suitable programming language, such as a database language including, e.g., JSON, XML, or other suitable language. In some embodiments, the static network model includes, e.g., a static network map of the network based on each node, each link and each policy associated with each normalized device representation of the at least one device of the plurality of devices.

In some embodiments, a routing protocol peering session is established between each device of the network and a routing protocol server at block 504 such that the routing protocol server receives updates from each peering session with each device. In some embodiments, the updates include advertised routing protocol prefixes from each device, including, e.g., routing addresses associated with each link.

In some embodiments, invariants for routing states for efficient and stable operation of the network may be expressed as code objects at block 505.

In some embodiments, the protocol prefix updates may be compared against the invariants objects at block 506. In some embodiments, the objects may be code objects that are executable to check for the presence of the invariants in subject data. In some embodiments, the protocol prefix updates may be the subject data such that upon running the invariants objects, conditions of the protocol prefix updates are checked to determine a presence of the invariants.

In some embodiments, based on the routing protocol prefixes, routing advertisements are determined at block 507. The routing advertisements may include advertised aggregate routes that each device is advertising in the routing protocol peering sessions. In some embodiments, the aggregate routes may be advertised where the aggregate route includes at least one specific route.

In some embodiments, the advertised aggregate routes may be compared to configured aggregate routes at block 508. Based on the static network model, the configured aggregate routes may be modelled against the advertised aggregate routes to determine where a configured aggregate route is missing from the routing advertisements.

In some embodiments, incorrectly configured aggregate routes may be removed at block 509. In some embodiments, a list of sleeping aggregates may be displayed on a screen associated with an administrator. The administrator may then manually remove the sleeping aggregates from the associated configurations. However, in some embodiments, the sleeping aggregates may be automatically removed by, e.g., incorporating a deleting function to delete detected sleeping aggregates. Where a configured aggregate route is missing from routing advertisements, the corresponding configured aggregate route may be a sleeping aggregate that has been misconfigured to not include specific routes. Such sleeping aggregates may cause errors and inefficiencies. Thus, the sleeping aggregates may be removed from the associated device representations to facilitate improved efficiency and robustness of the network.

Figure 6:
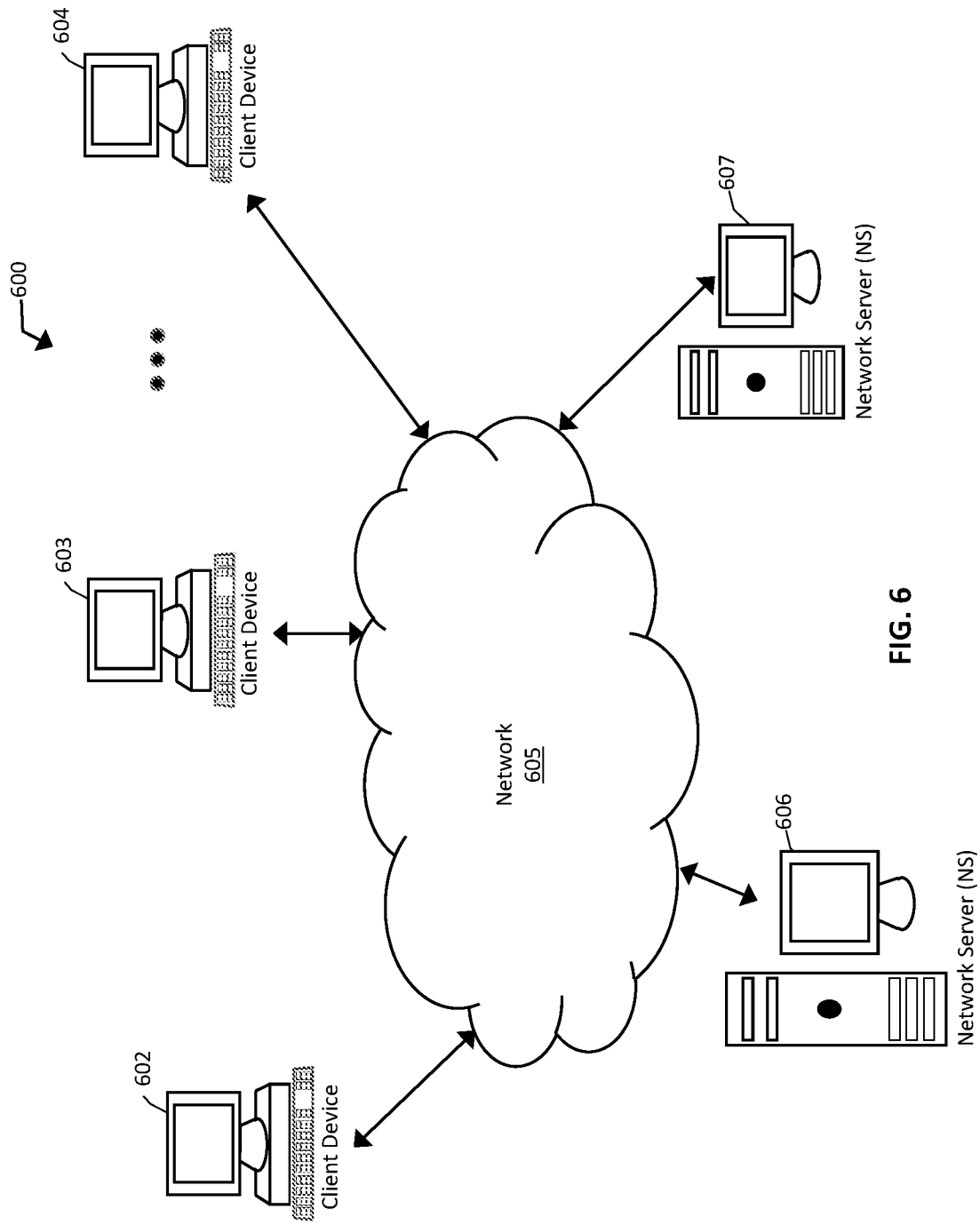

FIG. 6 depicts a block diagram of an exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 600 may be configured to manage a large number of members and/or concurrent transactions, as detailed herein. In some embodiments, the exemplary computer-based system/platform 600 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 602-604 (e.g., clients) of the exemplary computer-based system/platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired (e.g., Ethernet, fiber optic, etc.) and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ and/or other suitable programming language. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Microsoft Windows Server, Linux, or other network operating system. In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 602-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
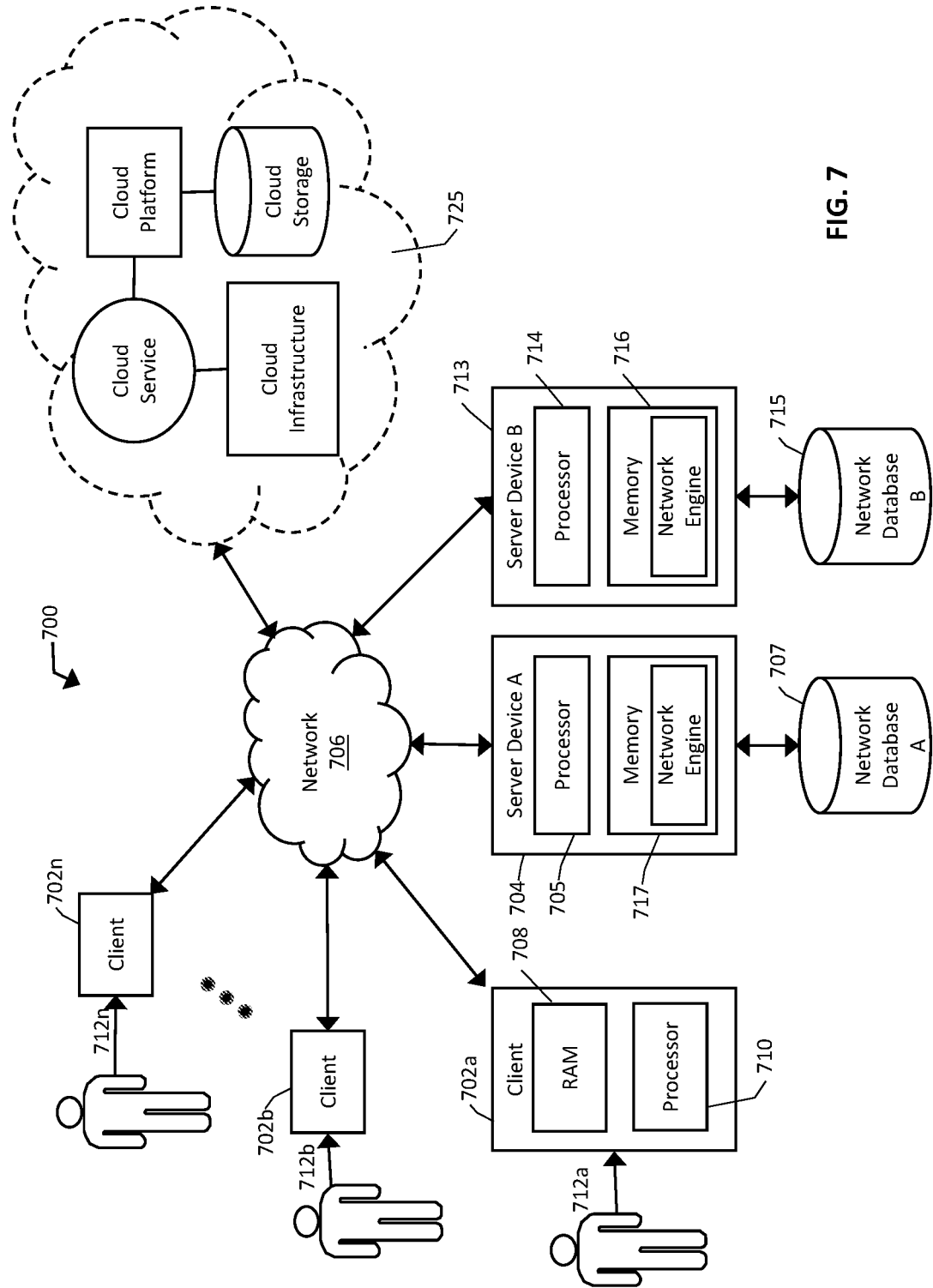

FIG. 7 depicts a block diagram of another exemplary computer-based system/platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, solid-state drive, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™ Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, users, 712a-n, may communicate over the exemplary network 706 with each other and/or with other systems and/or devices coupled to the network 706. As shown in FIG. 7, exemplary server devices 704 and 713, including processors 705 and 714, and memory 717 and 716, respectively, may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
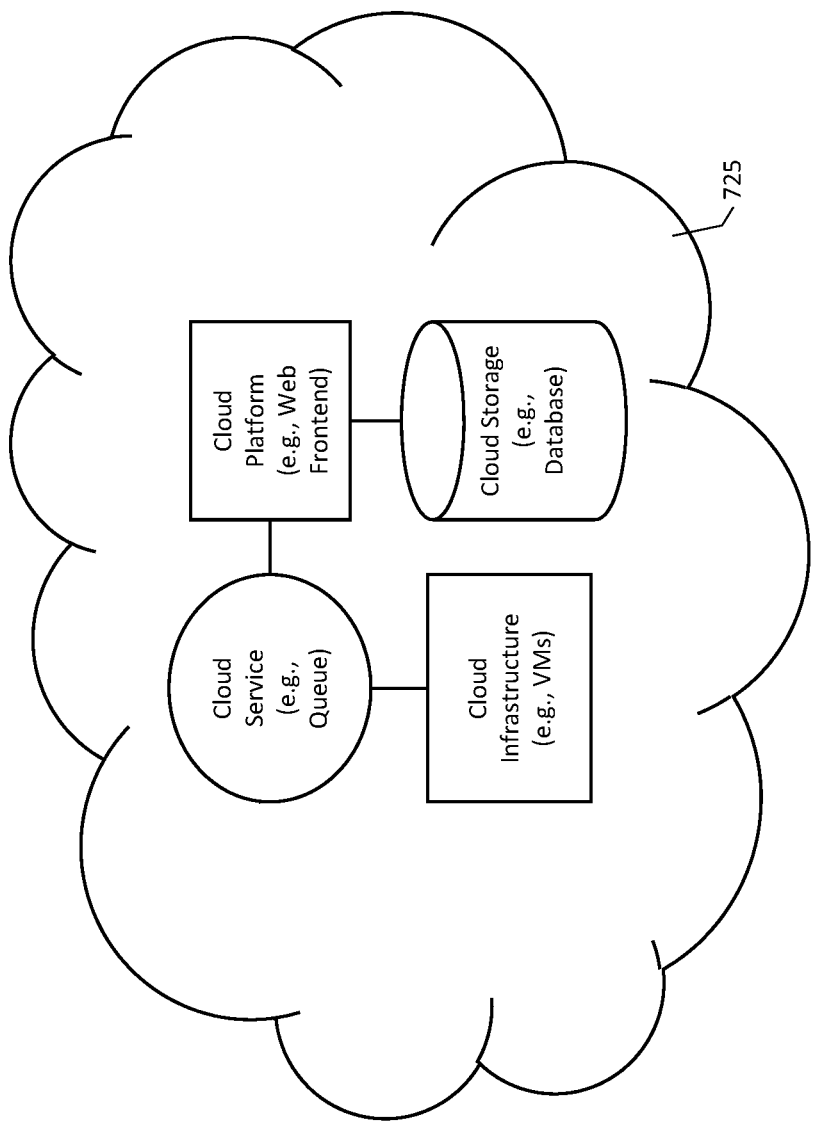
Figure 9:
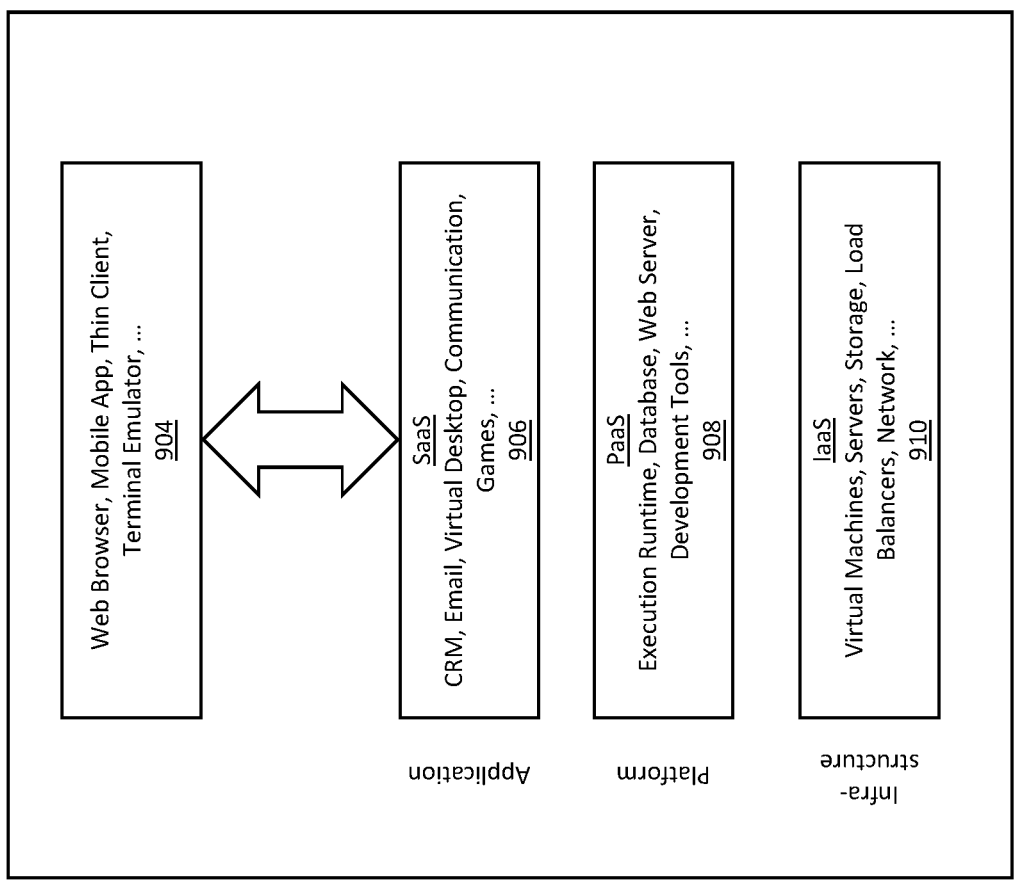

In some embodiments, the exemplary inventive computer-based systems/platforms, the exemplary inventive computer-based devices, and/or the exemplary inventive computer-based components of the present disclosure may be specifically configured to operate in a cloud computing/ architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/ platforms, the exemplary inventive computer-based devices, and/or the exemplary inventive computer-based components of the present disclosure may be specifically configured to operate.

At least some aspects of the present disclosure will now be described with reference to the following numbered clauses.

1. A method comprising:
   determining, by at least one processor, a device representation of each device of a plurality of devices on a network;
   determining, by the at least one processor, a normalized device representation associated with at least one device representation of the plurality of devices using a library of device representation parser functions;
   wherein at least one normalized device representation comprises:
   i) a node associated with a respective device of the plurality of devices,
   ii) a policy for device connection protocols associated with the respective device,
   iii) one or more links associated with the respective device of the plurality of devices, and
   iv) a run-time device state;
   wherein each link of the set of one or more links comprises an electronic connection between the respective device and another device of the plurality of devices;
   generating, by the at least one processor, a static network map of the network based on each normalized device representation of the at least one device of the plurality of devices;
   wherein each normalized device representation of the at least one device of the plurality of devices comprises:

i) a node configuration of a respective node at which the at least one device resides,
ii) a link configuration for each link associated with the respective node at which the at least one device resides, and
iii) a routing policy configuration associated with the respective node at which the at least one device resides;

establishing a routing protocol peering session between at least one device of the plurality of devices and a routing protocol server using a routing protocol;

determining, by the at least one processor, a status of at least one device and at least one link of the plurality of devices based on updates from each routing protocol peering session;
wherein the updates comprise a plurality of protocol prefixes;

generating, by the at least one processor, a live map of the network based on the status of each device;

determining, by the at least one processor, configuration errors and network errors based at least in part on the static network map and the live map;

determining, by the at least one processor, routing errors based at least in part on a comparison between the plurality of protocol prefixes and a plurality of predetermined network invariants;

recording in a database, by the at least one processor, a snapshot of a network state at a selected time;
wherein the network state comprises a routing information base associated with at least one device of the plurality of devices; and
wherein the routing information base comprises the status of each device and the status of each link based on the updates.

2. The method of clause 1, wherein the determining of the normalized device representation associated with at least one device representation of the plurality of devices using a library of device representation parser functions comprises:
determining, by the at least one processor, a configuration format associated with the at least one device representation;
selecting, by the at least one processor, a set of parser functions associated with the configuration format; and
translating, by the at least one processor, the configuration format associated with the at least one device representation into a normalized format associated with the normalized device representation.

3. The method of clause 1, wherein the determining of the static network map of the network further comprises:
generating, by the at least one processor, a configuration object binding in a programming language for the normalized device representation associated with the at least one device representation of the plurality of devices;
aggregating, by the at least one processor, each configuration object binding into a static network model; and
generating, by the at least one processor, a network graph object binding in the programming language to represent the static network map of the network in the programming language.

4. The method of clause 1, wherein the routing protocol comprises a Border Gateway Protocol (BGP).

5. The method of clause 1, further comprising generating, by the at least one processor, a respective object binding for each respective device representation of each respective device of the plurality of devices on the network; and
wherein each of the static network map and the live map are generated using the respective object binding of each respective device representation of respective device of the plurality of devices on the network.

6. The method of clause 1, further comprising:
receiving, by the at least one processor, at least one device data item of each device of the plurality of devices on the network; and
determining, by the at least one processor, each respective device representation of each respective device of the plurality of devices on the network by parsing each respective at least one device data item.

7. The method of clause 1, further comprising determining, by the at least one processor, routing errors based on a comparison of the static network map and the plurality of predetermined network invariants.

8. The method of clause 7, wherein the plurality of predetermined network invariants comprise:
i) an associated unique internet protocol (IP) address for each device of the plurality of devices,
ii) at least one respective redundant node associated with at least one respective device of the plurality of devices,
iii) an identical policy for each at least one respective redundant node, and
iv) a predetermined set of one or more software versions for at least one device of the plurality of devices.

9. The method of clause 1, wherein the network comprises a layer 3 network.

10. The method of clause 1, further comprising causing to display, by the at least one processor, a topological state visualization representing a current network state responsive to a point-in-time selection with at least one computing device associated with at least one user;
wherein the current network state is based at least in part on the static network map and the live map.

11. The method of clause 1, wherein the status of each device based on the updates comprises a respective link up/down state.

12. The method of clause 1, further comprising determining, by the at least one processor, a device representation exception to associate with an unrecognized device representation.

13. A method comprising:
transmitting, by at least one first processor to at least one second processor, a visualization selection to represent a current topological state of a network selected by at least one user with at least one user computing device;
receiving, by the at least one first processor from the at least one second processor, a topological state visualization representing the current topological state of the network based at least in part on a static network map and a live map;
wherein the current topological state of the network comprises a respective state of each respective node associated with each respective device of a plurality of devices and the set of one or more links associated with the respective device of the plurality of devices;
wherein the at least one second processor generates the topological state visualization by:
determining a device representation of each device of a plurality of devices on the network;
determining a normalized device representation associated with at least one device representation of the plurality of devices using a library of device representation parser functions;
wherein at least one normalized device representation comprises:
i) a node associated with a respective device of the plurality of devices,
ii) a policy for device connection protocols associated with the respective device, iii) a set of links associated with the respective device of the plurality of devices, and iv) a run-time device state;

wherein each link of the set of one or more links comprises an electronic connection between the respective device and another device of the plurality of devices;

generating a static network map of the network based on each normalized device representation of the at least one device of the plurality of devices;

wherein each normalized device representation of the at least one device of the plurality of devices comprises:

i) a node configuration of a respective node at which the at least one device resides, ii) a link configuration for each link associated with the respective node at which the at least one device resides, and iii) a routing policy configuration associated with the respective node at which the at least one device resides;

establishing a routing protocol peering session between at least one device of the plurality of devices and a routing protocol server using a routing protocol;

determining a status of at least one device and at least one link of the plurality of devices based on updates from each routing protocol peering session;

wherein the updates comprise a plurality of protocol prefixes;

generating the live map of the network based on the status of each device;

determining configuration errors and network errors based at least in part on the static network map and the live map;

determining routing errors based at least in part on a comparison between the plurality of protocol prefixes and a plurality of predetermined network invariants;

recording in a database a snapshot of a network state at a selected time;

wherein the network state comprises a routing information base associated with at least one device of the plurality of devices; and wherein the routing information base comprises the status of each device and each link based on the updates.

14. The method of clause 13, wherein the determining of the normalized device representation associated with at least one device representation of the plurality of devices using a library of device representation parser functions comprises:

determining, by the at least one processor, a configuration format associated with the at least one device representation;

selecting, by the at least one processor, a set of parser functions associated with the configuration format; and translating, by the at least one processor, the configuration format associated with the at least one device representation into a normalized format associated with the normalized device representation.

15. The method of clause 13, wherein the determining of the static network map of the network further comprises:

generating, by the at least one processor, a configuration object binding in a programming language for the normalized device representation associated with the at least one device representation of the plurality of devices;

aggregating, by the at least one processor, each configuration object binding into a static network model; and generating, by the at least one processor, a network graph object binding in the programming language to represent the static network map of the network in the programming language.

16. The method of clause 13, wherein the routing protocol comprises a Border Gateway Protocol (BGP).

17. The method of clause 13, wherein the at least one second processor is further configured to perform steps comprising generating a respective object binding for each respective device representation of each respective device of the plurality of devices on the network; and wherein each of the static network map and the live map are generated using the respective object binding of each respective device representation of respective device of the plurality of devices on the network.

18. The method of clause 13, wherein the at least one second processor is further configured to perform steps comprising:

receiving a device data item of each device of the plurality of devices on the network; and determining each respective device representation of each respective device of the plurality of devices on the network by parsing each respective device data item.

19. The method of clause 13, wherein the at least one second processor is further configured to perform steps the plurality of predetermined network invariants based on the static network map.

20. The method of clause 19, wherein the plurality of predetermined network invariants comprise:

i) an associated unique internet protocol (IP) address for each device of the plurality of devices, ii) at least one respective redundant node associated with at least one respective device of the plurality of devices, iii) an identical policy for each at least one respective redundant node, and iv) a predetermined set of one or more software versions for at least one device of the plurality of devices.

21. The method of clause 13, wherein the network comprises a layer 3 network.

22. The method of clause 13, wherein the status of each device based on the updates comprises a respective link up/down state.

23. The method of clause 13, wherein the at least one second processor is further configured to determine a device representation exception to associate with an unrecognized device representation.

24. A system comprising:

a network comprising a plurality of devices in electronic communication;

a database in electronic communication with the network; and at least one processor in electronic communication with the network and configured to perform instructions comprising:

determining a device representation of each device of a plurality of devices on a network;

determining a normalized device representation associated with each device representation of the plurality of devices using a library of device representation parser functions;

wherein at least one normalized device representation comprises:

i) a node associated with a respective device of the plurality of devices, ii) a policy for device connection protocols associated with the respective device, iii) a set of one or more links associated with the respective device of the plurality of devices, and iv) a run-time device state;
  wherein each link of the set of one or more links comprises an electronic connection between the respective device and another device of the plurality of devices;
generating a static network map of the network based on each normalized device representation of the at least one device of the plurality of devices;
  wherein each normalized device representation of the at least one device of the plurality of devices comprises:
    i) a node configuration of a respective node at which the at least one device resides,
    ii) a link configuration for each link associated with the respective node at which the at least one device resides, and
    iii) a routing policy configuration associated with the respective node at which the at least one device resides;
establishing a routing protocol peering session between at least one device of the plurality of devices and a routing protocol server using a routing protocol;
determining a status of at least one device and of at least one link of the plurality of devices based on updates from each routing protocol peering session;
  wherein the updates comprise a plurality of protocol prefixes;
generating a live map of the network based on the status of each device;
determining configuration errors and network errors based at least in part on the static network map and the live map;
determining routing errors based at least in part on a comparison between the plurality of protocol prefixes and a plurality of predetermined network invariants;
recording in the database a snapshot of a network state at a selected time;
  wherein the network state comprises a routing information base associated with at least one device of the plurality of devices; and
  wherein the routing information base comprises the status of each device and each link based on the updates.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
  determining, by at least one processor, a device representation of each respective device of a plurality of devices on a network;
  determining, by the at least one processor, a normalized device representation associated with at least one device representation of the plurality of devices using a library of device representation parser functions;
    wherein at least one normalized device representation comprises:
      i) a node associated with each respective device of the plurality of devices,
      ii) a policy for device connection protocols associated with each respective device of the plurality of devices,
      iii) one or more links associated with each respective device of the plurality of devices, and
      iv) a run-time device state;
    wherein each link of the one or more links comprises an electronic connection between each respective device and another device of the plurality of devices;
  generating, by the at least one processor, a static network map of the network based on each normalized device representation of the at least one device of the plurality of devices;
    wherein each normalized device representation of the at least one device of the plurality of devices comprises:
      i) a node configuration of a respective node at which the at least one device resides,
      ii) a link configuration for each link associated with the respective node at which the at least one device resides, and
      iii) a routing policy configuration associated with the respective node at which the at least one device resides;
  establishing a routing protocol peering session between at least one device of the plurality of devices and a routing protocol server using a routing protocol;
  determining, by the at least one processor, a status of at least one device and at least one link of the plurality of devices based on updates from each routing protocol peering session;
    wherein the updates comprise a plurality of protocol prefixes;
  generating, by the at least one processor, a live map of the network based on the status of each device;
  determining, by the at least one processor, configuration errors and network errors based at least in part on the static network map and the live map;
  determining, by the at least one processor, routing errors based at least in part on a comparison between the plurality of protocol prefixes and a plurality of predetermined network invariants;
  recording in a database, by the at least one processor, a snapshot of a network state at a selected time;
    wherein the network state comprises a routing information base associated with at least one device of the plurality of devices; and
    wherein the routing information base comprises the status of each respective device of the plurality of devices and the status of each link based on the updates.

2. The method of claim 1, wherein the determining of the normalized device representation associated with at least one device representation of the plurality of devices using a library of device representation parser functions comprises:
  determining, by the at least one processor, a configuration format associated with the at least one device representation;
  selecting, by the at least one processor, a set of parser functions associated with the configuration format; and
  translating, by the at least one processor, the configuration format associated with the at least one device representation into a normalized format associated with the normalized device representation.

3. The method of claim 1, wherein the generating of the static network map of the network further comprises:
generating, by the at least one processor, a configuration object binding in a programming language for the normalized device representation associated with the at least one device representation of the plurality of devices;
aggregating, by the at least one processor, each configuration object binding into a static network model; and
generating, by the at least one processor, a network graph object binding in the programming language to represent the static network map of the network in the programming language.

4. The method of claim 1, wherein the routing protocol comprises a Border Gateway Protocol (BGP).

5. The method of claim 1, further comprising generating, by the at least one processor, a respective object binding for each respective device representation of each respective device of the plurality of devices on the network; and
wherein each of the static network map and the live map are generated using the respective object binding of each respective device representation of each respective device of the plurality of devices on the network.

6. The method of claim 1, further comprising:
receiving, by the at least one processor, at least one device data item of each device of the plurality of devices on the network; and
determining, by the at least one processor, each respective device representation of each respective device of the plurality of devices on the network by parsing each respective at least one device data item.

7. The method of claim 1, further comprising determining, by the at least one processor, routing errors based on a comparison of the static network map and the plurality of predetermined network invariants.

8. The method of claim 7, wherein the plurality of predetermined network invariants comprise:
i) an associated unique internet protocol (IP) address for each respective device of the plurality of devices,
ii) at least one respective redundant node associated with at least one respective device of the plurality of devices,
iii) an identical routing policy for each at least one respective redundant node, and
iv) a predetermined set of one or more software versions for the at least one device of the plurality of devices.

9. The method of claim 1, wherein the network comprises a layer 3 network.

10. The method of claim 1, further comprising causing to display, by the at least one processor, a topological state visualization representing a current network state responsive to a point-in-time selection with at least one computing device associated with at least one user;
wherein the current network state is based at least in part on the static network map and the live map.

11. The method of claim 1, wherein the status of each respective device of the plurality of devices is based on the updates comprises a respective link up/down state.

12. The method of claim 1, further comprising determining, by the at least one processor, a device representation exception to associate with an unrecognized device representation.

13. A method comprising:
transmitting, by at least one first processor to at least one second processor, a visualization selection to represent a current topological state of a network selected by at least one user with at least one user computing device;
receiving, by the at least one first processor from the at least one second processor, a topological state visualization representing the current topological state of the network based at least in part on a static network map and a live map;
wherein the current topological state of the network comprises a respective state of each respective node associated with each respective device of a plurality of devices and one or more links associated with each respective device of the plurality of devices;
wherein the at least one second processor generates the topological state visualization by:
determining a device representation of each respective device of a plurality of devices on the network;
determining a normalized device representation associated with at least one device representation of the plurality of devices using a library of device representation parser functions;
wherein at least one normalized device representation comprises:
i) a node associated with each respective device of the plurality of devices,
ii) a policy for device connection protocols associated with each respective device of the plurality of devices,
iii) the one or more links associated with each respective device of the plurality of devices, and
iv) a run-time device state;
wherein each link of the one or more links comprises an electronic connection between each respective device of the plurality of devices and another device of the plurality of devices;
generating the static network map of the network based on each normalized device representation of the at least one device of the plurality of devices;
wherein each normalized device representation of the at least one device of the plurality of devices comprises:
i) a node configuration of a respective node at which the at least one device resides,
ii) a link configuration for each link associated with the respective node at which the at least one device resides, and
iii) a routing policy configuration associated with the respective node at which the at least one device resides;
establishing a routing protocol peering session between at least one device of the plurality of devices and a routing protocol server using a routing protocol;
determining a status of at least one device and at least one link of the plurality of devices based on updates from each routing protocol peering session;
wherein the updates comprise a plurality of protocol prefixes;
generating the live map of the network based on the status of each device;
determining configuration errors and network errors based at least in part on the static network map and the live map;
determining routing errors based at least in part on a comparison between the plurality of protocol prefixes and a plurality of predetermined network invariants;

recording in a database a snapshot of a network state at a selected time;
wherein the network state comprises a routing information base associated with at least one device of the plurality of devices; and
wherein the routing information base comprises the status of each device and each link based on the updates.

14. The method of claim 13, wherein the determining of the normalized device representation associated with at least one device representation of the plurality of devices using a library of device representation parser functions comprises:
determining, by the at least one processor, a configuration format associated with the at least one device representation;
selecting, by the at least one processor, a set of parser functions associated with the configuration format; and
translating, by the at least one processor, the configuration format associated with the at least one device representation into a normalized format associated with the normalized device representation.

15. The method of claim 13, wherein the generating of the static network map of the network further comprises:
generating, by the at least one processor, a configuration object binding in a programming language for the normalized device representation associated with the at least one device representation of the plurality of devices;
aggregating, by the at least one processor, each configuration object binding into a static network model; and
generating, by the at least one processor, a network graph object binding in the programming language to represent the static network map of the network in the programming language.

16. The method of claim 13, wherein the routing protocol comprises a Border Gateway Protocol (BGP).

17. The method of claim 13, wherein the at least one second processor is further configured to perform steps comprising generating a respective object binding for each respective device representation of each respective device of the plurality of devices on the network; and
wherein each of the static network map and the live map are generated using the respective object binding of each respective device representation of each respective device of the plurality of devices on the network.

18. The method of claim 13, wherein the at least one second processor is further configured to perform steps comprising:
receiving a device data item of each respective device of the plurality of devices on the network; and
determining each respective device representation of each respective device of the plurality of devices on the network by parsing each respective device data item.

19. The method of claim 13, wherein the at least one second processor is further configured to perform steps the plurality of predetermined network invariants based on the static network map.

20. The method of claim 19, wherein the plurality of predetermined network invariants comprise:
i) an associated unique internet protocol (IP) address for each respective device of the plurality of devices,
ii) at least one respective redundant node associated with at least one respective device of the plurality of devices,
iii) an identical policy for each at least one respective redundant node, and
iv) a predetermined set of one or more software versions for at least one device of the plurality of devices.

21. The method of claim 13, wherein the network comprises a layer 3 network.

22. The method of claim 13, wherein the status of each respective device of the plurality of devices is based on the updates comprises a respective link up/down state.

23. The method of claim 13, wherein the at least one second processor is further configured to determine a device representation exception to associate with an unrecognized device representation.

24. A system comprising:
a network comprising a plurality of devices in electronic communication;
a database in electronic communication with the network; and
at least one processor in electronic communication with the network and configured to perform instructions comprising:
determining a device representation of each respective device of a plurality of devices on a network;
determining a normalized device representation associated with each device representation of the plurality of devices using a library of device representation parser functions;
wherein at least one normalized device representation comprises:
i) a node associated with each respective device of the plurality of devices,
ii) a policy for device connection protocols associated with each respective device of the plurality of devices,
iii) one or more links associated with each respective device of the plurality of devices, and
iv) a run-time device state;
wherein each link of the one or more links comprises an electronic connection between each respective device of the plurality of devices and another device of the plurality of devices;
generating a static network map of the network based on each normalized device representation of the at least one device of the plurality of devices;
wherein each normalized device representation of the at least one device of the plurality of devices comprises:
i) a node configuration of a respective node at which the at least one device resides,
ii) a link configuration for each link associated with the respective node at which the at least one device resides, and
iii) a routing policy configuration associated with the respective node at which the at least one device resides;
establishing a routing protocol peering session between at least one device of the plurality of devices and a routing protocol server using a routing protocol;
determining a status of at least one device and of at least one link of the plurality of devices based on updates from each routing protocol peering session;
wherein the updates comprise a plurality of protocol prefixes;
generating a live map of the network based on the status of each device;
determining configuration errors and network errors based at least in part on the static network map and the live map;

determining routing errors based at least in part on a comparison between the plurality of protocol prefixes and a plurality of predetermined network invariants;

recording in the database a snapshot of a network state at a selected time;
- wherein the network state comprises a routing information base associated with at least one device of the plurality of devices; and
- wherein the routing information base comprises the status of each respective device of the plurality of devices and each link based on the updates.

* * * * *